US012564830B2

(12) United States Patent
Luz-Minguez et al.

(10) Patent No.: US 12,564,830 B2
(45) Date of Patent: Mar. 3, 2026

(54) POROUS METAL ORGANIC FRAMEWORK-POLYMER COMPOSITES FOR USE IN DETOXIFYING CHEMICAL WARFARE AGENTS

(71) Applicant: Research Triangle Institute, Research Triangle Park, NC (US)

(72) Inventors: Ignacio Luz-Minguez, Durham, NC (US); Mustapha Soukri, Cary, NC (US); David Dausch, Research Triangle Park, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 895 days.

(21) Appl. No.: 17/471,747

(22) Filed: Sep. 10, 2021

(65) Prior Publication Data

US 2022/0258144 A1 Aug. 18, 2022

Related U.S. Application Data

(60) Provisional application No. 63/088,615, filed on Oct. 7, 2020.

(51) Int. Cl.
B01J 31/16 (2006.01)
A62D 3/35 (2007.01)
(Continued)

(52) U.S. Cl.
CPC ............ B01J 31/1691 (2013.01); A62D 3/35 (2013.01); B01D 53/8668 (2013.01);
(Continued)

(58) Field of Classification Search
CPC ..... B01J 31/1691; B01J 31/1805; A62D 3/35; A62D 2101/02; A62D 2101/26
See application file for complete search history.

(56) References Cited

U.S. PATENT DOCUMENTS 8,883,676 B1 11/2014 Peterson et al.
10,272,279 B2 4/2019 Hupp et al.
(Continued)

FOREIGN PATENT DOCUMENTS

WO 2018031733 A1 2/2018
WO 2019222566 A1 11/2019

OTHER PUBLICATIONS

Wang, et al. "Nanoscale polymer metalaorganic framework hybrids for effective photothermal therapy of colon cancers."â-Advanced Materialsâ-28.42 (2016): 9320-9325 (Year: 2016).*
(Continued)

*Primary Examiner* — Anthony J Zimmer
*Assistant Examiner* — Eric Scott Sherman
(74) *Attorney, Agent, or Firm* — Rimon P.C.; Allyn B. Elliott

(57) ABSTRACT

A metal organic framework (MOF)-polymer composite for detoxifying a chemical warfare agent (CWA) comprises MOF nanoparticles having catalytically active Lewis acid sites and at least one polymer having catalytically active basic sites. The composite is configured such that the at least one polymer is in surrounding relation to the MOF nanoparticles such that at least a portion of the Lewis acid sites of the MOF nanoparticles are in proximal relation to at least a portion of the basic sites of the at least one polymer thereby forming a plurality of proximal acid-base interfaces thus enabling a bifunctional catalytic mechanism for detoxifying the CWA. The MOF-polymer composite can provide CWA detoxification without the presence of a basic compound.

13 Claims, 15 Drawing Sheets a

(51) Int. Cl.

| | |
|---|---|
| *B01D 53/86* | (2006.01) |
| *B01J 31/06* | (2006.01) |
| *B01J 35/45* | (2024.01) |
| *B01J 35/59* | (2024.01) |
| *B01J 37/03* | (2006.01) |
| *B01J 37/04* | (2006.01) |
| *A62D 101/02* | (2007.01) |
| *A62D 101/26* | (2007.01) |

(52) U.S. Cl.
CPC .............. *B01J 31/06* (2013.01); *B01J 35/45* (2024.01); *B01J 35/59* (2024.01); *B01J 37/031* (2013.01); *B01J 37/04* (2013.01); *A62D 2101/02* (2013.01); *A62D 2101/26* (2013.01); *B01D 2255/705* (2013.01); *B01D 2257/556* (2013.01); *B01J 2231/005* (2013.01); *B01J 2235/00* (2024.01); *B01J 2235/10* (2024.01); *B01J 2235/30* (2024.01); *B01J 2531/48* (2013.01)

(56) References Cited

U.S. PATENT DOCUMENTS

2021/0008529 A1    1/2021  Luz Minguez et al.
2021/0053024 A1    2/2021  Luz Minguez et al.

OTHER PUBLICATIONS

Zhao, et al. "In-situ growth of polyvinylpyrrolidone modified Zr-MOFs thin-film nanocomposite (TFN) for efficient dyes removal." Composites Part B: Engineering 176 (2019): 107208 (Year: 2019).*

Xu, et al. "Ti-exchanged UiO-66-NH2âcontaining polyamide membranes with remarkable cation permselectivity." Journal of Membrane Science 615 (2020): 118608 (Year: 2020).*

Zhang, et al. "Preparation of nanofibrous metal-organic framework filters for efficient air pollution control." Journal of the American Chemical Society 138.18 (2016): 5785-5788, Supplementary Materials (Year: 2016).*

Zhang, et al. "Preparation of nanofibrous metal-organic framework filters for efficient air pollution control." Journal of the American Chemical Society 138.18 (2016): 5785-5788 (Year: 2016).*

Son, F., et. al., "Uncovering the role of metal-organic framework topology on the capture and reactivity of chemical warfare agents", Chemistry of Materials, 2020, 32 (11), 9 pages.

Mondloch, J., et. al., "Destruction of chemical warfare agents using metal-organic frameworks", Nature Materials, May 2015, 14 (5), 6 pages.

Bobbitt, N., et. al., "Metal-organic frameworks for the removal of toxic industrial chemicals and chemical warfare agents", Chem. Soc. Rev., Feb. 2017, 29 pages.

Islamoglu, T., et. al., "Presence versus proximity: The role of pendant amines in the catalytic hydrolysis of a nerve agent simulant" Angewandte Chemie, Int. Ed. 2018, 57 (7), 5 pages.

Palomba, J., et al., "High-throughput screening of solid-state catalysts for nerve agent degradation", Chem. Commun. Apr. 2018, 54 (45), 4 pages.

Kalaj, M., et al., "Spray-coating of catalytically active mof-polythiourea through postsynthetic polymerization", Angewandte Chemie, Int. Ed. 2020, 59 (33), 6 pages.

Palomba, J., et al., "High-throughput screening of mofs for breakdown of v-series nerve agents", ACS Applied Materials and Interfaces, Jan. 2020, 12 (13), 6 pages.

Chen, Z., et al., "Toward base heterogenization: A zirconium metal-organic framework/dendrimer or polymer mixture for rapid hydrolysis of a nerve-agent simulant", ACS Applied Nano Materials 2019, Feb. 2020, (2), 4 pages.

Luz, I., et. al., "Confining metal-organic framework nanocrystals within mesoporous materials: A general approach via "solid-state" synthesis", Chemistry of Materials, Aug. 2017, 29 (22), 11 pages.

Cirujano, F., et. al., "Boosting the catalytic performance of metal-organic frameworks for steroid transformations by confinement within a mesoporous scaffold", Angewandte Chemie, Int. Ed. 2017, 56 (43), 5 pages.

Knebel, A.,et. al., "Solution processable metal-organic frameworks for mixed matrix membranes using porous liquids", Nature Materials, Dec. 2020, 10 pages.

Luz, I., et. al., "Synthesis of soluble metal organic framework composites for mixed matrix membranes", ACS Applied Materials & Interfaces, 2019, 11 (17), 8 pages.

Maserati, L., et. al., "Minute-mofs: Ultrafast synthesis of m2(dobpdc) metal-organic frameworks from divalent metal oxide colloidal nanocrystals", Chemistry of Materials, Feb. 2016, 28 (5), 8 pages.

Luz, I., et. al., "Understanding the formation mechanism of metal nanocrystal@mof-74 hybrids", ACS Publications, Chemistry of Materials, May 2016, 28 (11), 11 pages.

Katz, M., et. al., "Exploiting parameter space in mofs: A 20-fold enhancement of phosphate-ester hydrolysis with uio-66-nh2", Chemical Science, Royal Society of Chemistry, Feb. 2015, 6 pages.

Chen, L., et. al., "Chemical protection fabrics via surface oximation of electrospun polyacrylonitrile fiber mats", Journal of Materials Chemistry, Jan. 2009, 19 (16), 7 pages.

Luz, I., et. al., "Pd@uio-66-type mofs prepared by chemical vapor infiltration as shape-selective hydrogenation catalysts", European Journal of Inorganic Chemistry, 2015, (23), 9 pages.

Gomes Silva, et. al., "Water stable zr-benzenedicarboxylate metal-organic frameworks as photocatalysts for hydrogen generation", Chemistry—A European Journal, 2010, 16 (36), 6 pages.

Kandiah, M., et. al., "Synthesis and stability of tagged uio-66 zr-mofs" Chemistry of Materials, Nov. 2010, 22 (24), 9 pages.

Wong, K., et. al., "The reaction mechanism of paraoxon hydrolysis by phosphotriesterase from combined qm/mm simulations", Biochemistry, Jul. 2007, 46 (46), 18 pages.

Hao, T., et al., "Electrorheological Fluids, The Non-aqueous Suspensions: Chapter 4", Studies in Interface Science, ELSEVIER, Nov. 2005, 38 pages.

Li, Y., et. al., "Kno3-mediated synthesis of high-surface-area polyacrylonitrile-based carbon material for exceptional supercapacitors", Carbon, ELSEVIER, Jun. 2019, 152, 8 pages.

Kalinovskyy, Y., et. al., "Swell and destroy: A metal-organic framework-containing polymer sponge that immobilizes and catalytically degrades nerve agents", ACS Applied Materials & Sciences, Jan. 2020, 12 (7), 8 pages.

Guillerm, V., et. al., "A zirconium methacrylate oxocluster as precursor for the low-temperature synthesis of porous zirconium(iv) dicarboxylates", Chem. Commun., 2010, 46 (5), 3 pages.

Tranchemontagne, D., et. al., "Reticular chemistry of metal-organic polyhedra", Angew. Chem., Int. Ed. 2008, 47 (28), 12 pages.

Ma, K., et. al., "Fiber composites of metal-organic frameworks", Chemistry of Materials, Aug. 2020, 32 (17), 21 pages.

Dechnik, J., et. al., "Mixed-matrix membranes", Angewandte Chemie, Int. Ed. 2017, 56 (32), 19 pages.

Kitao, T., et. al., "Hybridization of mofs and polymers" Chemical Society Reviews, Jun. 2017, 46 (11), 27 pages.

Zhang, Y., et. al., "Preparation of nanofibrous metal-organic framework filters for efficient air pollution control", Journal of the American Chemical Society, Apr. 2016, 138 (18), 4 pages.

Bromberg, L., et. al., "Nucleophilic polymers and gels in hydrolytic degradation of chemical warfare agents", ACS Applied Materials & Interfaces, Sep. 2015, 7 (39), 11 pages.

Luz, I., et. al., "Polyamine-containing fluidized mof/sio2 hybrid materials for co2 capture from post-combustion flue gas", Chemical Science, Royal Society of Chemistry, Apr. 2018, 9 (20), 11 pages.

* cited by examiner

FIG. 2A        FIG. 2B        FIG. 2C
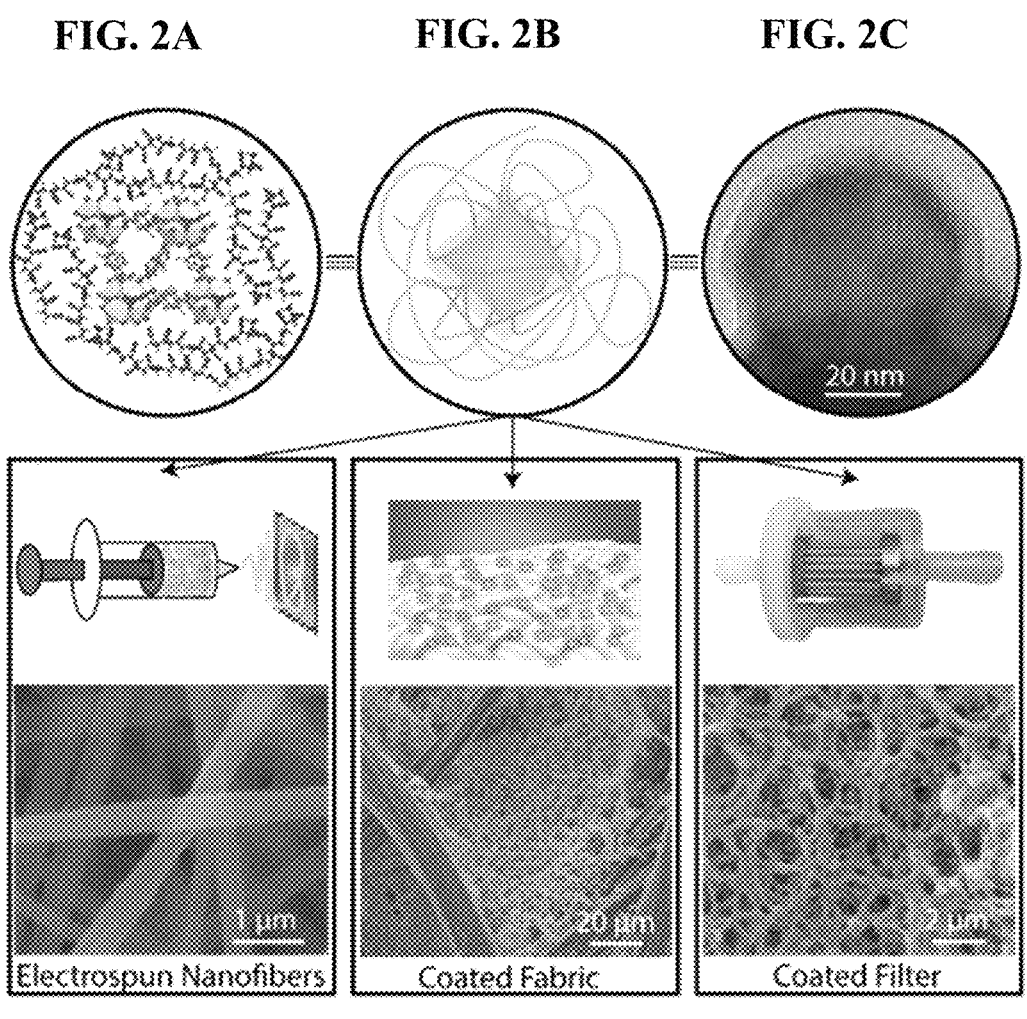
FIG. 2D        FIG. 2E        FIG. 2F

FIG. 3D          FIG. 3E
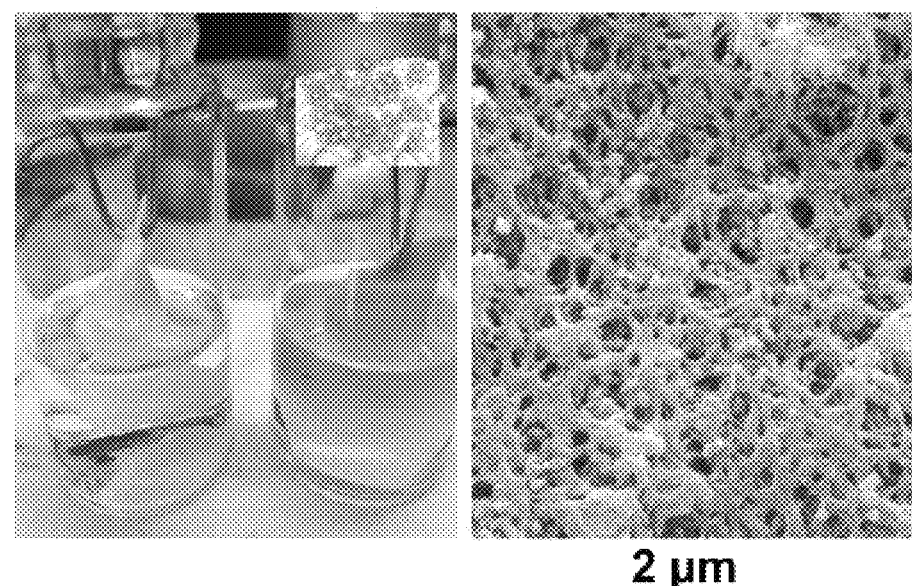
2 μm

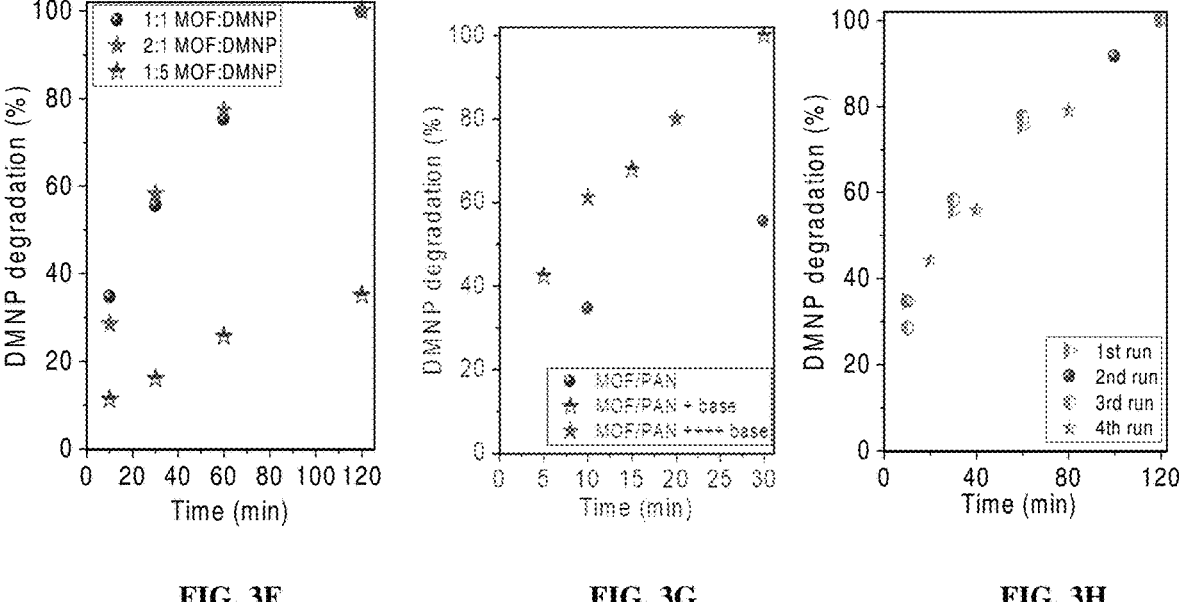
FIG. 3F                    FIG. 3G                    FIG. 3H

FIG. 5A                       FIG. 5B
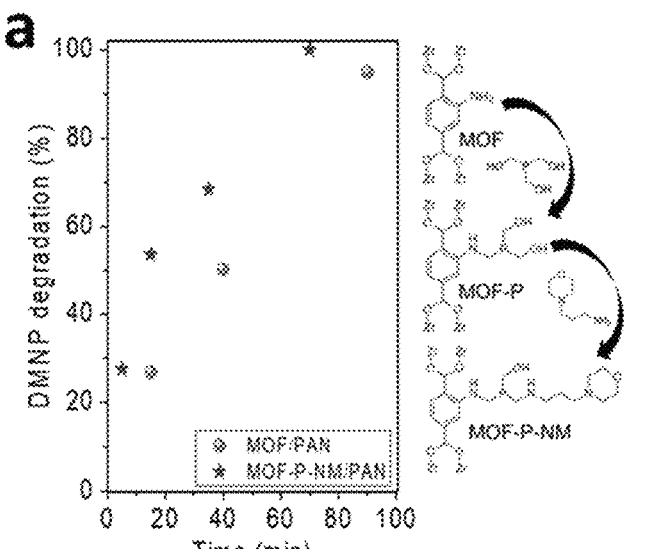 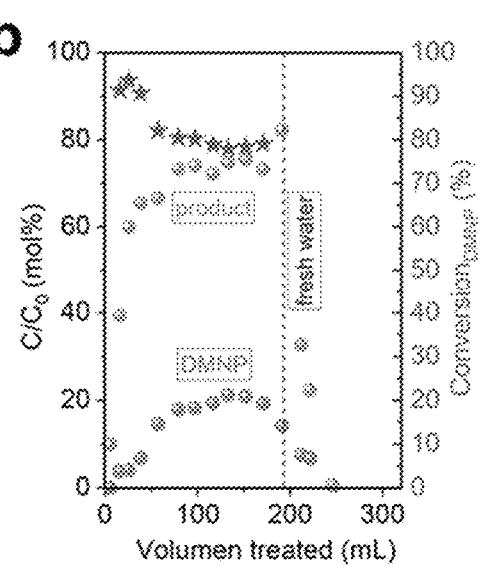

POROUS METAL ORGANIC FRAMEWORK-POLYMER COMPOSITES FOR USE IN DETOXIFYING CHEMICAL WARFARE AGENTS

CROSS-REFERENCE TO RELATED APPLICATION

This application claims the benefit of U.S. Provisional Patent Application No. 63/088,615, filed on Oct. 7, 2020, the entire content of which is incorporated herein by reference.

TECHNICAL FIELD

The present disclosure describes use of a metal organic framework (MOF)-polymer composite as a catalyst for detoxifying chemical warfare agents (CWAs). The MOF-polymer composite can be engineered into various functional forms for multiple end-use applications including with personal protective equipment for individuals and in detoxifying bulk CWAs, such as those related to stockpiled neurotoxins or environmental mishaps or spills.

BACKGROUND

Chemical warfare agents (CWAs), such as organophosphonates, are highly toxic compounds that can cause death in concentrations as low as 0.01 ppm due to irreversible binding to acetylcholinesterase (AChE), a key enzyme involved in the regulation of choline ester-based neurotransmitters. Exposure to this class of compounds can lead to inhibition of the autonomic nervous system and death by asphyxiation. CWAs are a danger to soldiers and civilian populations. Therefore, there is a vital need to develop efficient, versatile, and economic materials for use with portable protection equipment (for example, masks and garments), as well as, bulk detoxification of CWAs.

Many CWAs contain chemical components or parts that can be degraded through hydrolysis. The degradable parts include organophosphorous bonds and phosphate ester bonds found in nerve agents such as Sarin or VX. During the last decade, metal organic frameworks (MOFs) have been studied as porous catalysts for the degradation and detoxification of organophosphonate nerve agents. Particularly, MOFs composed of zirconium clusters (for example, $Zr_6$ nodes) have been demonstrated as one of the most promising catalysts for CWA hydrolysis due to their Lewis acid catalytic activity, chemical stability (for example with water, acid and basic media), and tunability in terms of pore sizes, node connectivity/defectivity, functionality and particle sizes, which can lead to differences in catalytic performance as well as adsorption uptake.

Thus far, the catalytic detoxification of CWAs over MOF catalysts has been demonstrated in batch reaction configurations where a basic compound (primarily water-soluble organic amines) must to be present in excess, either as an aqueous buffer solution (for example, N-ethyl morpholine), or impregnated on the solid catalysts (for example, dendrimers, and linear and branched polyethyleneimines), to promote CWA hydrolysis via both controlling the pH of the reaction and regenerating the catalytically active Zr sites on the MOF. Use of excess amounts of basic compounds (in particular amine-based compounds) are not feasible in a real world situation because personal health can be endangered by exposure to water-leached or evaporated toxic amines (via respiratory ways, eyes, or skin) during regular use, especially when thoroughly washed in a laundry machine. Moreover, washing of these materials would also ultimately lead to material deactivation.

In the same way, currently available stockpile decontamination procedures are limited by a need for stoichiometric amounts of basic buffered solutions, which often tend to be massive amounts. Therefore, a need exists for an economic, straightforward, and universal solution for catalytic detoxification of CWAs.

SUMMARY OF THE DISCLOSURE

A metal organic framework (MOF)-polymer composite and methods for producing the same are described. The MOF-polymer composite can be used for detoxifying chemical warfare agents (CWAs) solely in the presence of water. Advantageously, the MOF-polymer composite can be solubilized in an organic solvent to form a MOF suspension that can be engineered into various functional forms using polymer shaping technologies. The engineered functional forms can be reused multiple times for CWA detoxification without loss of activity as active fabric filters for portable protection equipment and for bulk stockpile remediation.

In a first aspect of the invention, a metal organic framework (MOF)-polymer composite for detoxifying a chemical warfare agent (CWA) comprises MOF nanoparticles having catalytically active Lewis acid sites, and at least one water-insoluble polymer having catalytically active basic sites. The composite is configured such that at least one polymer is in surrounding relation to the MOF nanoparticles such that at least a portion of the Lewis acid sites of the MOF nanoparticles are in proximal relation to at least a portion of the basic sites of the at least one polymer thereby forming a plurality of proximal acid-base interfaces thus enabling a bifunctional catalytic mechanism for detoxifying the CWA.

In a second aspect of the invention, a method of detoxifying a chemical warfare agent (CWA) comprises exposing a MOF-polymer composite as described herein to the CWA thereby catalyzing a hydrolysis reaction in which the CWA is degraded into non-toxic products solely in the presence of water.

In a third aspect of the invention, a solvothermal method for manufacturing a metal organic framework-polymer composite comprises dissolving a MOF precursor and a polymer in a first solvent to form a precursor solution, heating the precursor solution thereby triggering formation of MOF nanocrystals in a polymer matrix, and precipitating the metal organic framework-polymer composite using a second solvent comprising water or an alcohol.

BRIEF DESCRIPTION OF THE FIGURES

The foregoing aspects and other features of the disclosure are explained in the following description, taken in connection with the accompanying drawings, wherein:

FIGS. 2(a) and 2(b) are schematic representations of a MOF-polymer composite ink showing MOF nanocrystals stabilized by a thin polymeric shell.

FIG. 2(c) is a TEM image of a MOF-polymer composite ink showing MOF nanocrystals stabilized by a thin polymeric shell.

FIG. 2(d) is an SEM image of MOF-polymer composite electrospun nanofibers.

FIG. 2(e) is an SEM image of MOF-polymer composite coated fabric.

FIG. 2(f) is an SEM image of a MOF-polymer composite coated filter.

FIG. 3(d) is a picture of MOF-polymer composite-coated fabrics (right) utilized for the catalytic tests compared to PAN-coated fabric (left).

FIG. 3(e) is an SEM image showing the porous microstructure of the MOF-polymer composite-coated fabric and the presence of small MOF nanocrystals.

FIG. 3(f) is a chart showing catalytic activity for 40 wt. % (Zr)UiO-66/PAN coated on fabric at varying MOF:DMNP molar ratios.

FIG. 3(g) is a chart showing reusability for 40 wt. % (Zr)UiO-66/PAN coated on fabric.

FIG. 3(h) is a chart showing activity sensitivity to addition of 2 equivalents (+) and 8 equivalents (++++) of N-methyl morpholine per DMNP equivalent for 40 wt. % (Zr)UiO-66/PAN coated on fabric.

FIGS. 5(a) and 5(b) are charts showing DMNP hydrolysis activity for 40 wt. % (Zr)UiO-66(NH$_2$)/PAN electrospun fabric after two-step post-synthesis modification consisting in tethering N-aminopropyl morpholine to MOF pending amines via phosphine linkage.

DETAILED DESCRIPTION

Figure 1A:
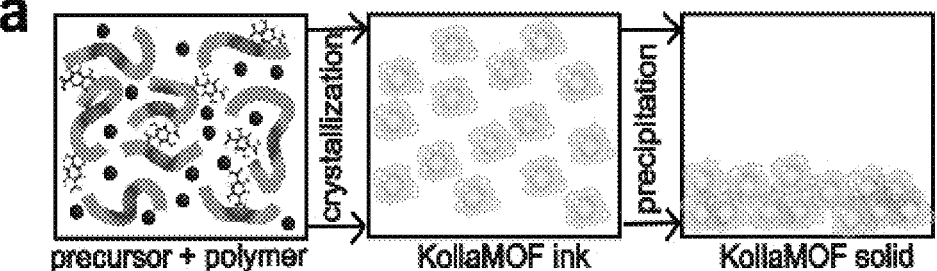
FIG. 1(a) is a schematic representation of MOF crystallization.
Figure 1B:
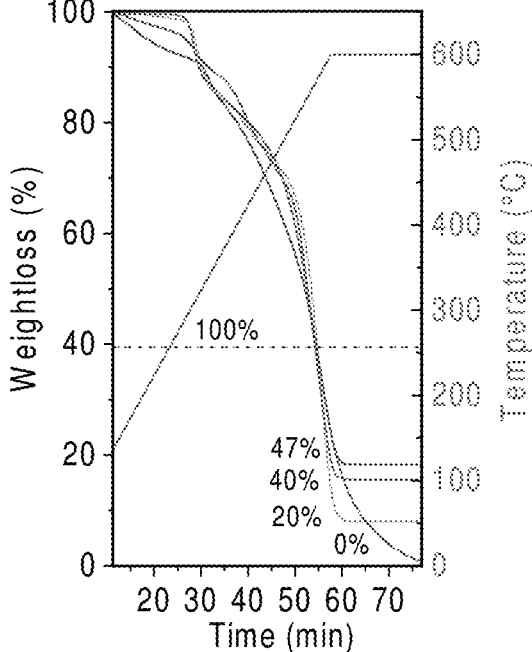
FIGS. 1(b), 1(c), 1(d), and 1(e) are charts illustrating characterization data for the exemplary MOF-polymer composite.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "a composite" means at least one composite and can include more than one composite.

Throughout the specification, the terms "about" and/or "approximately" may be used in conjunction with numerical values and/or ranges. The term "about" is understood to mean those values near to a recited value. For example, "about 40 [units]" may mean within +/−25% of 40 (e.g., from 30 to 50), within +/−20%, +/−15%, +/−10%, +/−9%, +/−8%, +/−7%, +/−6%, +/−5%, +/−4%, +/−3%, +/−2%, +/−1%, less than +/−1%, or any other value or range of values therein or there below. Furthermore, the phrases "less than about [a value]" or "greater than about [a value]" should be understood in view of the definition of the term "about" provided herein. The terms "about" and "approximately" may be used interchangeably.

Throughout the specification, numerical ranges are provided for certain quantities. It is to be understood that these ranges comprise all subranges therein. Thus, the range "from 50 to 80" includes all possible ranges therein (e.g., 51-79, 52-78, 53-77, 54-76, 55-75, 60-70, etc.). Furthermore, all values within a given range may be an endpoint for the range encompassed thereby (e.g., the range 50-80 includes the ranges with endpoints such as 55-80, 50-75, etc.).

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

Described herein is the use of a metal organic framework (MOF)-polymer composite as an acid/base bifunctional porous catalyst for detoxifying chemical warfare agents (CWAs). The MOF-polymer composite can be solubilized in an organic solvent (for example, THF, DMF and DMA) to form a MOF suspension (also referred to herein as a MOF colloidal suspension or ink) that can be engineered into various functional forms (for example, pellets, thin films, coatings, and nanofibers) using polymer shaping technologies ranging from solution electrospinning, casting or coating, to solid melting, extrusion, thermoforming or molding. The engineered functional forms (e.g., pellets, fabrics and coatings) can be reused multiple times without loss of activity.

A MOF-polymer composite comprises MOF particles having catalytically active Lewis acid sites, and a porous polymer having catalytically active basic sites. The composite is configured such that polymer is in surrounding relation to the MOF particles such that at least a portion of the Lewis acid sites of the MOF particles are in proximal relation to at least a portion of the basic sites of the polymer thereby forming a plurality of proximal acid-base interfaces where bifunctional catalytic reactions can take place, thereby detoxifying CWA that comes into contact with a material comprising the MOF-polymer composite.

Unlike existing MOF catalysts being used for CWA detox, the MOF-polymer composites described herein can provide CWA detoxification without the presence of a basic compound. The MOF-polymer composites exhibit a dual adsorbing-degrading mechanism, wherein neurotoxins from the CWA are first adsorbed in the porous MOF-polymer composite thereby buffering the exposure dose, and then the neurotoxins are subsequently hydrolyzed at bifunctional acid-base active sites in the MOF-polymer composite. The bifunctional active sites are present at the proximal interface locations between Lewis acid sites at the MOF nodes and basic sites at the functionality of the embedding polymeric matrix. A significant number of interfaces are present between the tiny and highly defective MOF nanocrystals (<50 nm) and the polymer matrix. The proximal interfaces enable the formation of the unique bifunctional catalytically active cavities.

Chemical warfare agents (CWAs) comprise a diverse group of extremely hazardous materials. Organophosphates are among the most toxic CWAs. Organophosphate nerve agents include tabun (GA), sarin (GB), soman (GD), chlorosarin (GC), ethylsarin (GE), GV, and cyclosarin (GF). Together they comprise the G-series nerve agents. Another known nerve agent is O-ethyl S-(2-diisopropylaminoethyl) methylphosphonothioate, which is in the V-series of nerve agents and is coded VX. The MOF-polymer composites described herein are effective in detoxifying CWAs including organophosphates.

As used herein, "detoxification" or "detoxifying" or degradation is the process of chemically converting highly toxic chemical warfare nerve agents into corresponding by-products that have much lower toxicity, such as little or no toxicity.

In the MOF-polymer composite, the nano-crystalline metal organic framework can be homogeneously dispersed throughout the composite material and may be substantially present only within the mesopores or void spaces of the porous polymeric material. The MOF-polymer composite may have a weight percentage of metal organic framework in the range of 5-50% relative to the total weight of the hybrid composite material. In embodiments, the weight percentage of MOF may be in a range of 15-50 wt %, 35-50 wt %, or 35-45 wt %. For example, the weight percentage of MOF may be 20 wt %, 25 wt %, 30 wt %, 35 wt %, 36 wt %, 37 wt %, 38 wt %, 39 wt %, 40 wt %, 41 wt %, 42 wt %, 43 wt %, 44 wt %, 45 wt %, or 50 wt %.

The MOF can be any suitable nano-crystalline MOF. As used herein, a metal organic framework may refer to compounds consisting of metal ions or clusters coordinated to organic ligands to form one-, two- or three-dimensional structures, with the special feature of porosity. More formally, a metal organic framework is a coordination network with organic ligands containing potential voids. In an embodiment, the nano-crystalline MOF has a percent porosity of greater than 10%, preferably greater than 20%, preferably greater than 25%, preferably greater than 30%, preferably greater than 35%, preferably greater than 40%.

MOFs are composed of two major components: a metal ion or cluster of metal ions and an organic molecule often termed a linker. The organic units are typically mono-, di-, tri-, or tetravalent ligands. The choice of metal and linker determines the structure and properties of the MOF. For example, the metal's coordination preference influences the size and shape of pores by dictating how many ligands can bind to the metal and in which orientation.

In the MOF-polymer composite, the MOF may be any commercially available MOF. MOFs containing nodes/clusters with individual metals or any combination of metals from group 4 and rare earth on the periodic table (e.g. Ti, Zr, Hf or Ce) may be used for catalytic detoxification of nerve agents. For example, the MOF may be any available MOF comprising Group 4 elements (i.e. Ti, Zr, Hf) or rare earth (i.e. Ce) as metal oxide node. Exemplary MOFs suitable for use in the MOF-polymer composite include, without limitation, MIL-101, MIL-100, MIL-53, MOF-74, UiO-66, UiO-67, ZIF-8, ZIFs, HKUST-1, M2(dobpdc), NU-1000, PCN-222, PCN-224, and derivatives thereof.

The polymeric material of the MOF-polymer composite may be any suitable polymeric material having mesopores and/or macropores. As used herein, a mesoporous material may refer to a material containing pores with diameters between 2-50 nm. The mesoporous polymeric material may have a percent porosity of greater than 10%, preferably greater than 20%, preferably greater than 25%, preferably greater than 30%, preferably greater than 35%, preferably greater than 40%. The mesoporous polymeric material may also contain larger pores (i.e., macropores) with diameters between 50-500 nm.

The MOF-polymer composite can comprise one or more polymeric materials. The polymer of the MOF-polymer composite is insoluble in water. Exemplary suitable polymeric materials include, without limitation, polybenzimidazoles, polyimides, polyvinyl butyral, polyacrylonitrile, polyvinyl pyridine, polyether block amide (e.g., PEBAX® sold by Arkema), PPEE, sulfonated poly (ether ether ketone) (SPEEK), 6-FDA and copolymers, polyvinylidene fluoride (PVDF), polymers of intrinsic microporosity (PIMs), polydimethylsiloxane (PDMS), polyvinyl acetate (PVAc), polyetherimide (for example, Ultem, manufactured by SABIC), poly(ferrocene-dimethylsilane)s (PFS), poly(phenylene oxide) (PPO), and similar.

The MOF-polymer composite may comprise mesopores with an average diameter in the range of 2-50 nm, 4-45 nm, or 6-40 nm and micropores with an average diameter in the range of 0.5-5.0 nm, 1.0-4.5 nm, or 2.0-4.0 nm. In embodiments, the mesopores, the micropores, or both are monodisperse having a coefficient of variation of less than 10%, preferably less than 8%, preferably less than 6%, preferably less than 5%, preferably less than 4%, preferably less than 3%. In embodiments, the MOF-polymer composite has a percent porosity of greater than 10%, greater than 20%, greater than 25%, greater than 30%, greater than 35%, or greater than 40%.

In embodiments, the nano-crystalline metal organic framework has an average longest linear dimension of less than 200 nm, less than 100 nm, less than 70 nm, or less than 40 nm. The nano-crystalline metal organic framework may have an average diameter in the range of 5-100 nm, or in the range of 5-50 nm.

The MOF-polymer composite may have a surface area in the range of 10-1200 m$^2$/g or at least 400 m$^2$/g. The MOF-polymer composite may comprise a polymeric mesoporous material comprising mesopores and a nano-crystalline metal organic framework comprising micropores, wherein the nano-crystalline metal organic framework is homogeneously dispersed and substantially present within the mesopores or void spaces of the mesoporous polymeric material, and wherein the MOF-polymer composite has a weight percentage of the metal organic framework in the range of 5-50% relative to the total weight of the MOF-polymer composite.

The MOF-polymer composite can be manufactured using a solid-state synthesis method, which is described more fully in commonly owned WO 2019/222566, which is incorporated by reference herein. In embodiments, the solid state synthesis method may comprise i) contacting an aqueous solution of an organic ligand salt with a mesoporous polymer to form an impregnated mesoporous salt polymer, ii) treating the impregnated mesoporous salt polymer with an aqueous acidic solution to form an impregnated mesoporous acid polymer, iii) contacting an aqueous solution of a metal precursor with the impregnated mesoporous acid polymer to form an impregnated mesoporous metal organic framework precursor, and iv) heating the impregnated mesoporous metal organic framework precursor in the absence of a solvent or exposing the impregnated mesoporous metal organic framework precursor to a volatile vapor in the absence of a solvent to form a MOF-polymer composite, wherein the MOF-polymer composite comprises a nano-crystalline metal organic framework (MOF) embedded within the mesoporous polymer.

In certain embodiments, the nano-crystalline metal organic framework is substantially present only within the mesopores or void spaces of the mesoporous polymer and substantially homogeneously dispersed within the mesopores or void spaces of the mesoporous polymer. As used herein, "disposed on", "embedded" or "impregnated" describes being completely or partially filled throughout, saturated, permeated and/or infused. The nano-crystalline MOF may be affixed substantially within the pore space of the mesoporous polymer. The nano-crystalline MOF may be affixed to the mesoporous polymer in any reasonable manner, such as physisorption or chemisorption and mixtures thereof. As used herein, homogeneous dispersion refers to dispersion in a similar or the same manner and may refer to uniform structure and composition.

The solid state synthesis method may further comprise drying at least one selected from the group consisting of the impregnated mesoporous salt material, the impregnated mesoporous acid material, the impregnated mesoporous metal organic framework precursor, and the MOF-polymer composite at a temperature in the range of 25-160° C. under a vacuum and with a drying time of up to 24 hours. The method may further comprise washing the MOF-polymer composite with distilled water or other polar protic solvent and extracting water from the MOF-polymer composite in a Soxhlet system recycling methanol or other polar protic solvent.

Additionally, the method may further comprise a purification step. The purification step may remove undesirable impurities or insoluble species present in the MOF-polymer composite material or remove metal organic frameworks that are outside the range of desirable size or shape. A purification step can aid in preparing MOF-polymer composite materials substantially free of impurities and having substantially uniformly sized metal organic frameworks. Such MOF-polymer composite materials are considered to be of high quality and are desirable in industrial applications. Additionally, high quality hybrid composite materials result in high quality suspensions, which are also desirable in industrial applications.

In the purification step, the MOF-polymer composite material may be dissolved in a solvent comprising one or more solvents, filtered, and subsequently precipitated using a precipitant or combination of precipitants. The MOF-polymer composite material may be dissolved in any solvent or combination of solvents in which it is soluble. Exemplary solvents include, but are not limited to, tetrahydrofuran, methanol, chloroform, dichloromethane, ethanol, N,N-dimethylformamide, acetonitrile, acetone, and the like. The dissolution may be performed at a temperature of up to 80° C. and have a contacting time of up to 48 hours.

The resulting solution can be filtered. Common filtering techniques are suitable. For example, the solution can be filtered using commercially available filter paper. The filtered solution can be contacted with a precipitant in order to precipitate the purified MOF-polymer composite material. For example, the filtered solution can be contacted with an organic liquid different from the solvent in which the hybrid composite material was dissolved in order to precipitate the MOF-polymer composite material. As one of skill in the art will appreciate, the precipitant will vary based on the composition of the MOF-polymer composite material. The MOF-polymer composite material may be precipitated using suitable liquids or combinations of liquids that achieve precipitation. Exemplary precipitants include, but are not limited to, water, methanol, ethanol, acetone, and the like. The precipitation may be performed at a temperature of up to 80° C. and have a contacting time of up to 1 hour, preferably 1-10 minutes. The resulting solid MOF-polymer composite material can be filtered using any suitable filtration technique. For example, the solid MOF-polymer composite material may be filtered using a filtration funnel.

The MOF-polymer composite can be converted to a suspension of the MOF nanocrystals wherein the polymeric material of the composite is dissolved in a non-aqueous liquid thereby forming a polymeric solution in which the MOF nanocrystals are substantially homogeneously dispersed and suspended. The non-aqueous liquid can be an organic solvent in which the polymeric material is soluble. Exemplary organic solvents include, but are not limited to, tetrahydrofuran, methanol, chloroform, dichloromethane, ethanol, N,N-dimethylformamide, acetonitrile, acetone, isopropanol, propanol, butanol, methylene chloride (CH$_2$Cl$_2$), toluene, dioxane and the like.

The MOF-polymer composite can also be manufactured using a solvothermal synthesis method. In the solvothermal method, MOF precursors and polymer are first dissolved in a non-aqueous solvent (for example, DMF) forming a precursor solvent and then heated. Heating temperatures can range from about 80° C. to about 200° C. For example, the heating temperature may be 100° C. Heating triggers MOF crystallization, which enables an instantaneous or "minute" MOF synthesis. For some MOFs, crystallization can be also triggered by addition of an organic amine (i.e. triethylamine) at room temperature. After crystallization, the MOF nanoparticles are suspended in a polymer matrix solution. The MOF-polymer composite can be isolated by precipitation in a solvent that is different from the original solvent in which the MOF precursors and polymer were dissolved. For example, the MOF-polymer composite can be precipitated in a solvent of water or MeOH and then filtered and washed thoroughly in a Soxhlet with MeOH. The purification procedure can be used for any polymer that is not soluble in MeOH or water, which act as precipitation agents. Exemplary polymers include, without limitation, polybenzimidazoles, polyimides, polyvinyl butyral, polyacrylonitrile, and polyvinyl pyridine, among others.

An exemplary embodiment of a MOF-polymer composite is one in which $(Zr)UiO-66(NH_2)$ nanocrystals are embedded in polyacrylonitrile (PAN). This embodiment is used in the foregoing examples to illustrate the synthesis approach and typical characterization routine. The skilled artisan will understand that the synthesis methods and characterization routines described herein in reference to $(Zr)UiO-66(NH_2)$ embedded in PAN are applicable to other MOF-polymer composite materials.

$(Zr)UiO-66(NH_2)$ is an effective catalyst for hydrolysis of CWAs. Polyacrylonitrile (PAN) can be used in this embodiment as a soluble porous polymer. PAN has previously been used as a reactive polymer that can be modified with nucleophilic functional groups, such as oxime or imidazole groups, and used as organocatalyst for CWA detoxification. As discussed in more detail below, surprisingly, the weak basicity of nitriles demonstrated excellent performance in providing the perfect balance between basic sites and Lewis acid $(Zr)UiO-66(NH_2)$ catalytic sites in the exemplary MOF-polymer composite.

In an embodiment, an exemplary MOF-polymer composite can be modified post-synthesis by covalently bonding amines to amino-functionalized MOFs through phosphine bridges. This modification can lead to enhanced catalytic performance for CWA hydrolysis. The resulting phosphine-tethered amino-containing compound provides stability against leaching in water and organic solvents. The post-synthesis modification allows for the heterogenization of additional basic sites at proximal distances to Zr Lewis acid sites.

In another embodiment, an exemplary MOF-polymer composite can be prepared using more than one polymeric material. The additional polymeric material may display free nucleophilic functional groups, typically found in enzymatic residues comprising aminoacids, such as alkylamines, anilines, imidazoles and pyridines. Blending one or more polymers during synthesis (e.g., during solvothermal synthesis) or post-synthesis (blending MOF-polymer composite inks with polymers) enables a wide variety of formulation design potentials.

The MOF-polymer composite material can be used in a method of detoxifying a chemical warfare agent. The porous MOF-polymer composite material advantageously is capable and adsorbing and detoxifying harmful CWAs. Adsorbing of CWAs can be very helpful in buffering CWA exposure under real-world conditions. Materials, such as the MOF-polymer composite material, that have relatively high porosity can adsorb a large amount of CWA thereby providing increased time for subsequent CWA degradation or detoxification within the pores of the MOF-polymer composite. The dual mechanism of adsorption and degradation encourages the use of the MOF-polymer composites described herein as an active material for use in systems and devices for alleviating harmful CWAs, such as catalytic scrubbers.

Embodiments of the MOF-polymer composite are highly effective at catalytically detoxifying chemical warfare agents. This detoxification can be accomplished on a bulk scale to detoxify banned chemical stockpiles safely and rapidly or to mitigate and detoxify nerve agent spills and leaks. Additionally, the detoxification can be accomplished on a personal scale such as through being coated on or embedded in personal protective equipment.

An embodiment of the method includes exposing the chemical warfare agent to the MOF-polymer composite, and catalytically detoxifying the CWA with the MOF-polymer composite. In an embodiment, the catalytic detoxification involves decomposition of the CWA through a hydrolysis reaction. The chemical warfare agent may be an organophosphate, an organophosphorus compound, or combinations thereof. For example, the chemical warfare nerve agent may comprises cyanogen chloride, hydrogen cyanide, ethyldichloroarsine (ED), methyldichloroarsine (MD), phenyldichloroarsine (PD), lewisite (L), sulfur mustard (HD, H, HT, HL, HQ), nitrogen mustard (NH1, NH2, NH3), Tabun (GA), Sarin (GB), Soman (GD), Cyclosarin (GF), GV, Methyl fluorophosphoryl homocholine iodid (MFPhCh), EA-3148, VE, VG, VM, VP, VR, VX, Novichok agents, phoshene oxime (CX), chlorine, chloropicrin (PS), phosgene (CG), diphosgene (DP), disulfur decafluoride, agent 15 (BZ), dimethylheptylpyran (DMHP), EA-3167, kolokol-1, LSD-25, PAVA spray, sleeping gas, pepper spray (OC), CS, Mace® (CN), CR, and combinations thereof.

Soluble MOF-polymer composites exhibit bifunctional (acid and basic) sites that enable heterogeneous catalytic hydrolysis of organophosphates without needing a buffer or other additive. In the MOF-polymer composite, polymers are used as a stabilizing matrix for synthesis of MOF nanocrystals and to provide catalytically active basic sites for degradation of CWAs. The MOF-polymer composites are tunable thus enabling optimization related to end use or application. As described herein, variable features of MOFs, polymers, and their combination, can affect their performance for CWA detoxification. Exemplary variable features include, without limitation, formulation, microstructure, interface, porosity, particle size, defectivity or functionality to physicochemical features or reaction configuration of the ultimate engineered form and prototypes.

Easy reusability of MOF-polymer composite coatings and fabrics enables their direct application in the destruction of nerve agents either in the battlefield (portable protection equipment) or in a continuous batch reactor (stockpile degradation). Porous MOF-polymer composites materials can be coated onto filters for catalytic scrubber reactors that offer a more efficient and realistic alternative against pulsed doses of CWA gases (portable respirator configuration) and decontamination of stockpiled CWAs (packed bed reactor configuration).

Protective respiratory systems that include porous catalytically active MOF-polymer composite materials having bifunctional acid/basic catalytic sites can enable complete adsorption of CWA within the available porosity of the composite, followed by a catalytic detoxification or decomposition of the CWA via hydrolysis within the catalytically active pore system or internal surface. Further, the MOF-polymer catalyst can be completely regenerated by washing away the non-toxic products of the CWA hydrolysis using solely pure water.

MOF-polymer composite multilayer fabrics can be commercially engineered into protection products ranging from garments and raincoats, to filters for water bottles and water treatment plants, as well as filters for personal respiratory systems based on wet catalytic scrubber configuration, by using polymer shaping technologies of the textile industry.

EXAMPLES

Example 1. Preparation and Characterization of a MOF-Polymer Composite

In this example, MOF-polymer composites were prepared using a solvothermal synthesis method. MOF precursors (precursors of (Zr)UiO-66(NH$_2$)) and polyacrylonitrile (PAN) were dissolved in dimethylformamide (DMF) and heated at 100° C. Heating triggered MOF crystallization, which resulted in a colloid-like MOF-polymer composite solution wherein MOF nanocrystals were suspended in a polymer solution. FIG. 1a is a schematic representation of MOF crystallization. The MOF-polymer composite was isolated by precipitation in water or MeOH. The precipitate was then filtered and washed thoroughly in a Soxhlet with MeOH. The exemplary MOF-polymer composite prepared in this example contained (Zr)UiO-66(NH$_2$) nanocrystals embedded in polyacrylonitrile (PAN). As will be seen in the examples below, the weak basicity of nitriles demonstrated excellent performance, providing a balance between basic sites and Lewis acid (Zr)UiO-66(NH$_2$) catalytic sites.

FIGS. 1b, 1c, 1d, and 1e are charts illustrating characterization data for the exemplary MOF-polymer composite. MOF-polymer composites having varying concentrations of MOF were prepared. The composite samples contained 20 wt. % MOF (orange), 40 wt. % MOF (yellow), and 47 wt. % MOF (green). Samples were also prepared with only MOF (i.e., bulk MOF, 100 wt. % MOF) (black) and only polymer (i.e., bare polymer, 0 wt. % MOF) (grey).

TGA analysis under air was used for the quantification of MOF loaded on the PAN matrix based on the resulting inorganic residue attributed to ZrO$_2$ (39.1 wt. % for bulk MOF). TGA analysis also revealed good thermal stability of the exemplary MOF-polymer composite up to 300° C. with release of labile species (MeOH and H$_2$O) typically occluded on the MOF pores.

Figure 1C:
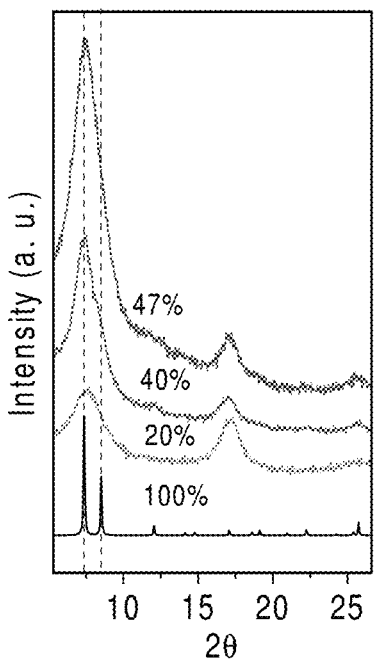

XRD patterns for the MOF-polymer composites at increasing MOF loadings revealed broad diffraction peaks attributed to the formation of tiny and defective MOF crystalline domains with the targeted (Zr)UiO-66(NH$_2$) phase (see FIG. 1c). The intensity of the diffraction peak centered between 7-9° increased as a function of MOF loading.

Figure 1D:
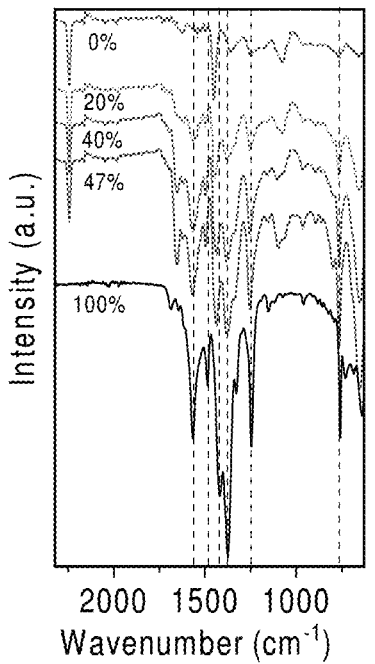

FIG. 1(d) is a chart showing FTIR spectra for the samples. FTIR analysis identified the fingerprint absorption bands attributed to both organic phases: UiO-66(NH$_2$) and PAN, thus further indicating the formation of the targeted MOF phase within the PAN matrix.

Surface area measurements were taken. They suggested strong interaction between MOF nanocrystals and non-porous polymer (<10 m$^2$/g), as polymeric chains may have been partially blocking the narrow amino containing pore windows of (Zr)UiO-66(NH$_2$) ($S_{BET}$~800 m$^2$/g). In the example, 40 wt. % MOF loading leads to a higher surface area per gram of MOF (550 m$^2$/g$_{MOF}$) than that measured for 20 wt. % and 47 wt. % MOF loading, which was 285 m$^2$/g$_{MOF}$ and 348 m$^2$/g$_{MOF}$, respectively. In addition, the sample with 40 wt. % MOF loading had significant creation of mesoporous cavities in comparison to the rest of formulations (See FIG. 1e), which translates to better catalytic performance.

Example 2. Preparation and Characterization of a MOF-Polymer Composite Ink

The MOF-polymer composite solid material was dissolved in DMF to produce a MOF-polymer composite ink wherein a polymer shell comprising PAN stabilized the MOF nanocrystals outer surfaces. FIGS. 2(a) and 2(b) are schematic representations of a MOF-polymer composite ink showing MOF nanocrystals stabilized by a thin polymeric shell. FIG. 2(c) is a TEM image of a MOF-polymer composite ink showing MOF nanocrystals stabilized by a thin polymeric shell.

MOF-polymer composite inks were directly processed by polymer shaping techniques, including solution electrospinning and coating. FIG. 2(d) is an SEM image of MOF-polymer composite electrospun nanofibers. FIG. 2(e) is an SEM image of MOF-polymer composite coated fabric. FIG. 2(f) is an SEM image of a MOF-polymer composite coated filter.

Different polymer shaping techniques are better suited for different composite loading amounts. For example, electrospinning appeared to work better with composite loadings of 8 to 15 wt %. While MOF-polymer composite materials can be embedded in varying concentrations into electrospun nanofibers, MOF-polymer composite dissolved in DMF at loadings between 8 and 15 wt. % of composites were found quite suitable. In the range, if higher MOF-polymer composite concentrations were used (e.g., 15 wt. % of composite), inks displaying better long-term suspension stability resulted. These inks had higher viscosity, which facilitated electrospinning for longer times without need for ink stirring.

Moreover, solution coating techniques appeared to work better for composite loading of 2 to 4 wt %. The range of MOF-polymer composite concentrations of 2 to 4 wt. % of composite showed better ability to penetrate within fibrous fabrics for a solution coating process. Lower MOF concentrations (2 wt. % of composite) allowed for thinner fiber surface coatings while relatively higher concentrations (4 wt. % of composite) produced a porous MOF-polymer composite matrix filling the inter-fiber spacing (see FIG. 2e).

The embedding process included soaking fabrics in MOF-polymer composite ink followed by MeOH (or H$_2$O) soaking to trigger polymer phase inversion while also gently exchanging the DMF from the MOF-polymer composite ink with no apparent detachment of MOF-polymer composite coating. The process enabled an efficient and homogeneous coating of the fabric with the MOF-polymer composite. As shown in FIG. 2(f), MOF-polymer composite inks can be coated on a commercial filtration system that can be used as an active layer in a catalytic scrubber for both CWA stockpile degradation and also portable protection equipment for CWA detoxification.

Example 3. Assessing Detoxification

To assess the catalytic performance of the MOF-polymer composites for CWA detoxification, dimethyl 4-nitrophenyl phosphate (DMNP) was used as a nerve agent simulant mimicking the reactivity of organophosphate-based CWAs. The performance of MOF-polymer composite materials shaped into coatings for CWA hydrolysis was evaluated.

Figure 3A:
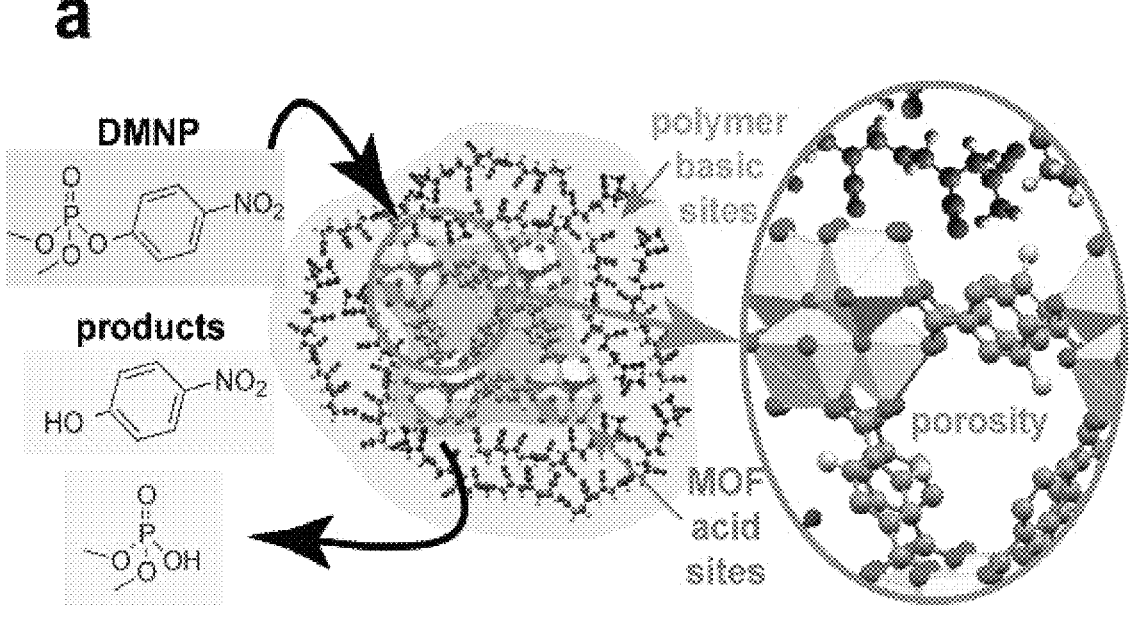
FIG. 3(a) is a schematic representation of the bifunctional nature of porous MOF-polymer composite catalysts.
Figure 3B:
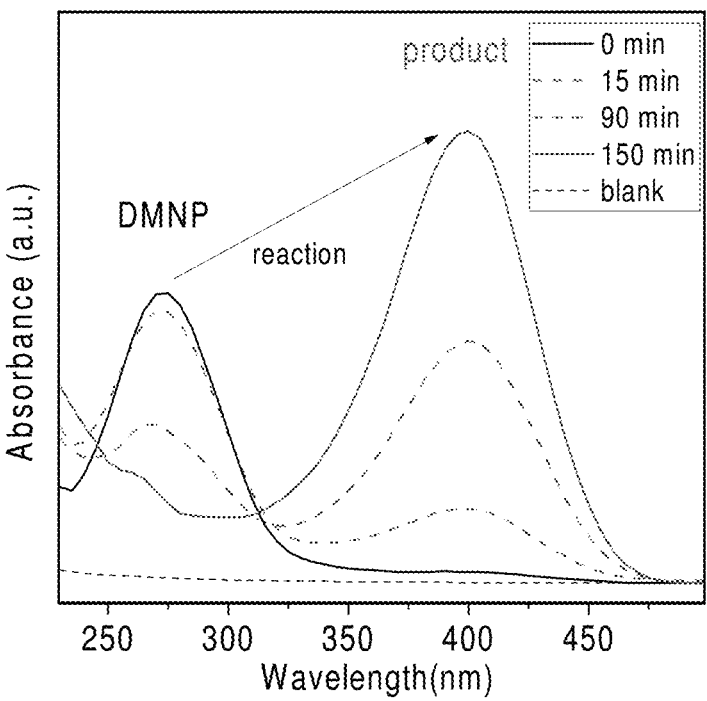
FIGS. 3(b) and 3(c) are UV-Vis spectroscopy images showing the catalytic performance of MOF-polymer composite materials coated on fabric for DMNP hydrolysis in pure water for 20 wt. % (Zr)UiO-66(NH$_2$)/PAN (FIG. 3(b)) and for 13.3 wt. % (Zr)UiO-66(NH$_2$)/6FDA-DAM (FIG. 3(c)).
Figure 3C:
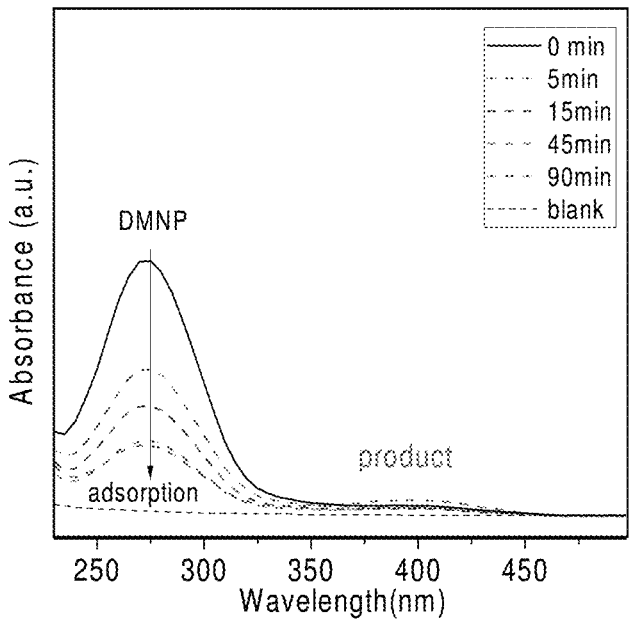

FIGS. 3(a)-3(e) are associated with Example 3. FIG. 3(a) is a schematic representation of the bifunctional nature of porous MOF-polymer composite catalysts. FIGS. 3(b) and 3(c) are UV-Vis spectroscopy images showing the catalytic performance of MOF-polymer composite materials coated on fabric for DMNP hydrolysis in pure water for 20 wt. % (Zr)UiO-66(NH₂)/PAN (FIG. 3(b)) and for 13.3 wt. % (Zr)UiO-66(NH₂)/6FDA-DAM (FIG. 3(c)). FIG. 3(d) is a picture of MOF-polymer composite-coated fabrics (right) utilized for the catalytic tests compared to PAN-coated fabric (left). FIG. 3(e) is an SEM image showing the porous microstructure of the MOF-polymer composite-coated fabric and the presence of small MOF nanocrystals.

Figure 1E:
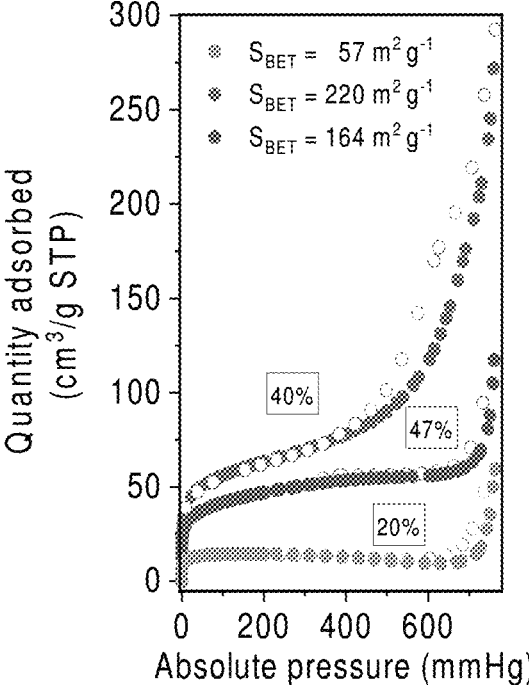

According to the UV-vis analysis, MOF-polymer composite coatings containing PAN showed a catalytic performance for DMNP hydrolysis without needing a basic buffer, in contrast to the same MOF combined with a polyimide (6FDA-DAM), which showed no activity. This result suggests that weak basic nitriles from PAN perform a similar role as soluble amines, which is, buffering the pH and regenerating the catalytically active Zr sites, but within the solid phase. This catalytic evidence suggests close proximity between basic polymeric nitriles and acidic Zr defective sites on the MOF nanocrystal surface. Close proximity between acid and base sites (or an acid-based interface) is also supported by the thin coating shell stabilizing the outer surface of the (Zr)UiO-66(NH₂) nanocrystals observed by TEM (FIG. 2c) and the partial pore blockage and creation of mesoporous cavities evidenced by $N_2$ sorption isotherms (FIG. 1e). The proximity between acid-basic sites appears to enable a bifunctional catalytic mechanism that mimics the catalytic pockets of enzymatic systems (e.g. phosphodiesterase).

Figure 6:
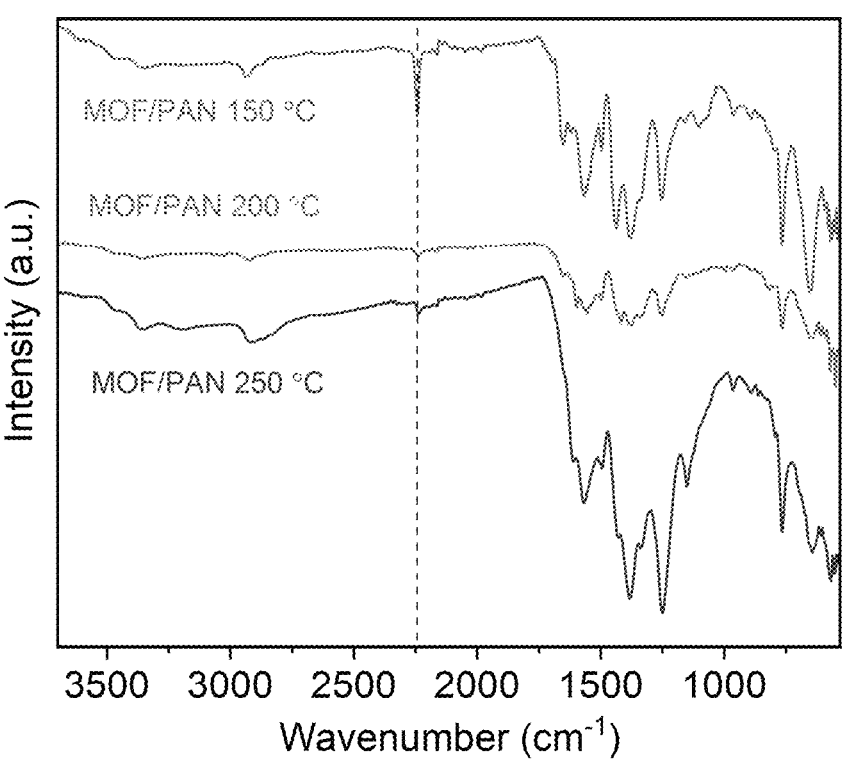
FIG. 6 is a chart showing FTIR spectra for MOF-polymer composite treated at increasing temperatures under air.

On the other hand, neither polyimide combined with MOF nor pure PAN revealed significant catalytic activity for DMNP hydrolysis under the same conditions. Moreover, thermal treatment under air over 200° C. showed complete loss of catalytic activity for DMNP hydrolysis, evidenced by complete disappearance of stretching of PAN nitriles at 2243 $cm^{-1}$ due to cyclization. FIG. 6, which shows FTIR spectra for MOF-polymer composite treated at increasing temperatures under air, illustrates this result.

These results support the essential catalytic role of PAN functional groups on the observed bifunctional reaction mechanism. In addition, UV-vis experiments showed the adsorbing ability of porous MOF-polymer composite materials, which was accentuated by the higher surface area of 6FDA-DAM polyimide (~500 $m^2 \cdot g^{-1}$) compared to non-porous PAN.

The processability of MOF-polymer composite inks into fabric coatings was evaluated by using different ink concentrations in DMF. Controlled coatings were prepared using consecutive cycles consisting in $1^{st}$) coating, $2^{nd}$) solvent-exchange, and $3^{rd}$) drying. For instance, up to 50 wt. % was achieved by performing 3 coatings using an ink containing 4 wt. % MOF-polymer composite in DMF. Lower ink concentrations allowed for thinner coatings; thus number of coatings and ink concentration can be used to tailor coating features depending on a specific end-use application.

The porous microstructure and bifunctional catalytic performance of the resulting MOF-polymer composite-coated fabric materials were evaluated by SEM analysis and their activity for DMNP hydrolysis, respectively. FIG. 3(e) is an SEM image showing the porous microstructure of the MOF-polymer composite-coated fabric and the presence of small MOF nanocrystals. SEM analysis of the coating showed the macroporous structure provided by the PAN polymeric matrix, which displayed monodispersed small round shapes attributed to small polymer-coated MOF nanocrystals.

Catalytic performance evaluations were performed to assess catalytic activity for 40 wt. % (Zr)UiO-66/PAN coated on fabric. The evaluations were carried out in batch configuration with distilled water (3 mL) stirring at room temperature using 10 mg of MOF-polymer composite phase (coated in fabric) and 0.5 mg of DMNP (1:1 MOF:DMNP molar ratio, except ratio indicated in (f)). Hydrolysis was monitored by band at λ=407 nm attributed to p-nitrophenoxy radical species according to literature (sample liquid aliquots were diluted in Tris buffer solution pH=7.4 to facilitate the formation of the radical species). No phase leaching was observed from the coated fabric and the aqueous phase remained non-colored, clear, and slightly acidic with pH (4.5-5.5) during the catalytic test.

FIGS. 3(f), (g) and (h) are charts showing catalytic data for 40 wt. % (Zr)UiO-66/PAN coated on fabric. FIG. 3(f) shows catalytic activity at varying MOF:DMNP molar ratios. FIG. 3(g) shows reusability. FIG. 3(h) shows activity sensitivity to addition of 2 equivalents (+) and 8 equivalents (++++) of N-methyl morpholine per DMNP equivalent. As shown in FIG. 3(f), full hydrolysis of DMNP was achieved in 2 hours in the absence of any additional base by using 1:1 MOF:DMNP molar ratio (considering mol of MOF=mol of $Zr_6$ cluster), which provides 50 nitrile groups per DMNP molecule.

Catalytically active sites for MOF-polymer composites are primarily located at the MOF-polymer interface, where nitrile and Zr defective sites are close enough to one another to impart a bifunctional catalytic mechanism. This hinders the calculation of the hydrolysis rate per active site only based on the total of either Zr sites or nitrile groups, as most of them solely display a structural role. The further reduction of MOF crystalline size can increase the MOF-polymer interface area, and thus the acid:base ratio. In this case, the use of isolated $Zr_6$ clusters or metal organic polyhedral (MOP) embedded on PAN may theoretically lead to higher catalytic activity. It is theorized that pending amino groups could also be contributing to the mechanism, although amino-free MOF-808 also demonstrated good catalytic activity, while (Zn)ZIF-8 or (Zr)UiO-66(COOH)₂ did not reveal significant activity.

As shown in FIG. 3(f), higher MOF:DMNP molar ratio did not lead to an enhancement of the DMNP hydrolysis rate, which suggests the existence of a mass transfer phenomena, resulting from the porous nature of the MOF-polymer catalyst, the heterogeneous nature of both active sites, and the batch reaction configuration (i.e. no facilitation of solution permeation across the coated fabric), which may be limiting the overall rate. On the other hand, reducing the ratio lead to a notable drop in activity, indicating that the optimal molar ratio for the MOF-polymer composite formulation is 1:1 MOF:DMNP.

To confirm the heterogeneous nature of MOF-polymer composite catalysts, several catalytic cycles were performed over the material with no loss of activity, highlighting its stability and reusability (see FIG. 3(g)). This result encourages use of MOF-polymer composite catalysts in continuous reaction configurations (e.g., detoxification of CWAs stockpiles).

In order to compare the MOF-polymer composite to state-of-the-art examples, in which CWA hydrolysis has always been carried out in the presence of soluble amines, as well as to capture the full potential of the Zr Lewis acid sites present on MOF-polymer composites, N-methyl morpholine (NMM) was added at two different molar ratios in respect to DMNP (2:1 and 8:1 NMM:DMNP, see FIG. 3h).

Upon addition of the soluble base, faster hydrolysis rates were measured (half-life within 5-10 minutes), which is comparable to the reported literature. The results confirmed the hypothesis that only bifunctional active sites originated at the interface of the MOF-polymer composite are active in the heterogeneous catalytic system, as larger availability of soluble, mobile basic sites lead to activity enhancement. Interestingly, adding more base (8:1 NMM:DMNP) did not lead to greater activity. This result aids in determining the maximum activity that can be achieved by the exemplary MOF-polymer composite by providing mobile (soluble) amine species to dormant, but available, Zr acid sites that would have been available to participate in a hydrolysis reaction upon enlargement of the MOF-polymer interface.

Example 4. Evaluation and Characterization of
MOF-Polymer Composite Loading

Figures 4A, 4B, 4C, 4D:
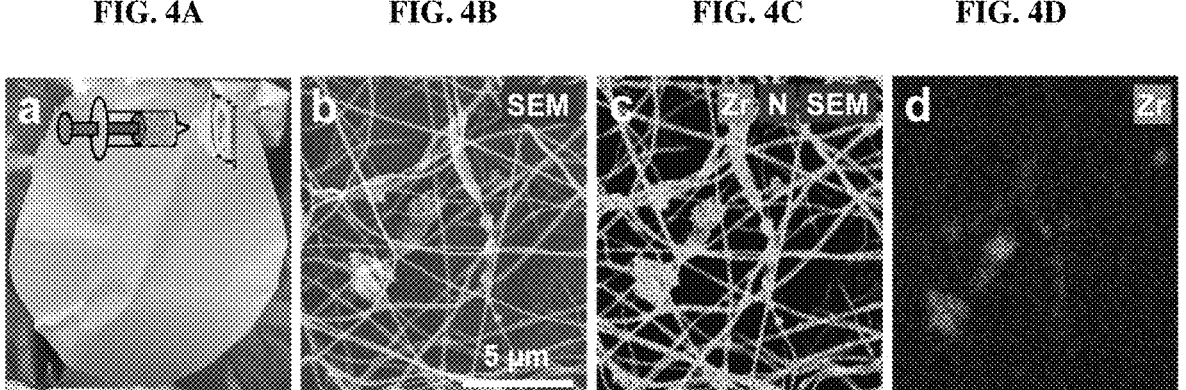
FIG. 4(a) is a picture of MOF-polymer composite electrospun nanofibers utilized for the catalytic tests.
FIGS. 4(b), 4(c), and 4(d) are SEM/EDS analysis showing the microstructure and composition of the MOF-polymer composite electrospun nanofibers (at 60 wt. % MOF).
Figure 4E:
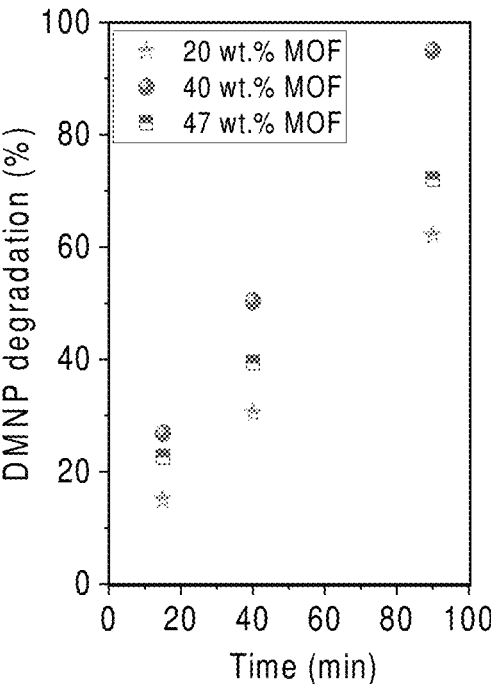
FIG. 4(e) is a chart showing catalytic activity for the different shaping process of (Zr)UiO-66(NH$_2$)/PAN materials at 40 wt % MOF loading (solid pellet, coated fabric and electrospun nanofibers).
Figure 4F:
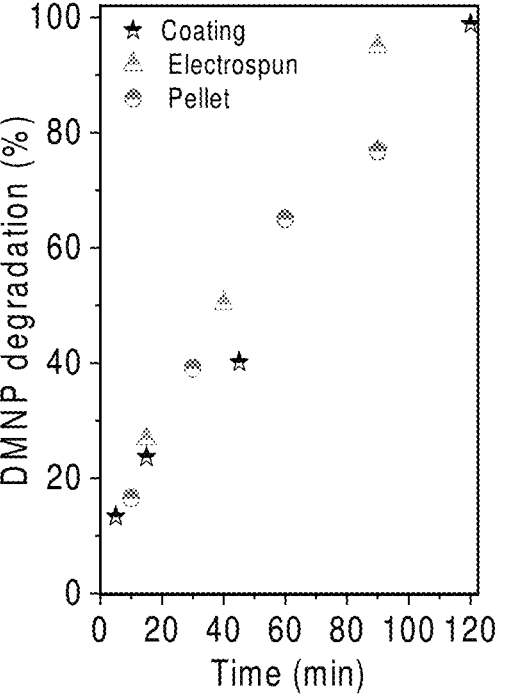
FIG. 4(f) is a chart showing catalytic activity (2$^{nd}$ run) for electrospun (Zr)UiO-66(NH$_2$)/PAN materials at different MOF loadings (20, 40 and 47 wt %).
Figure 4G:
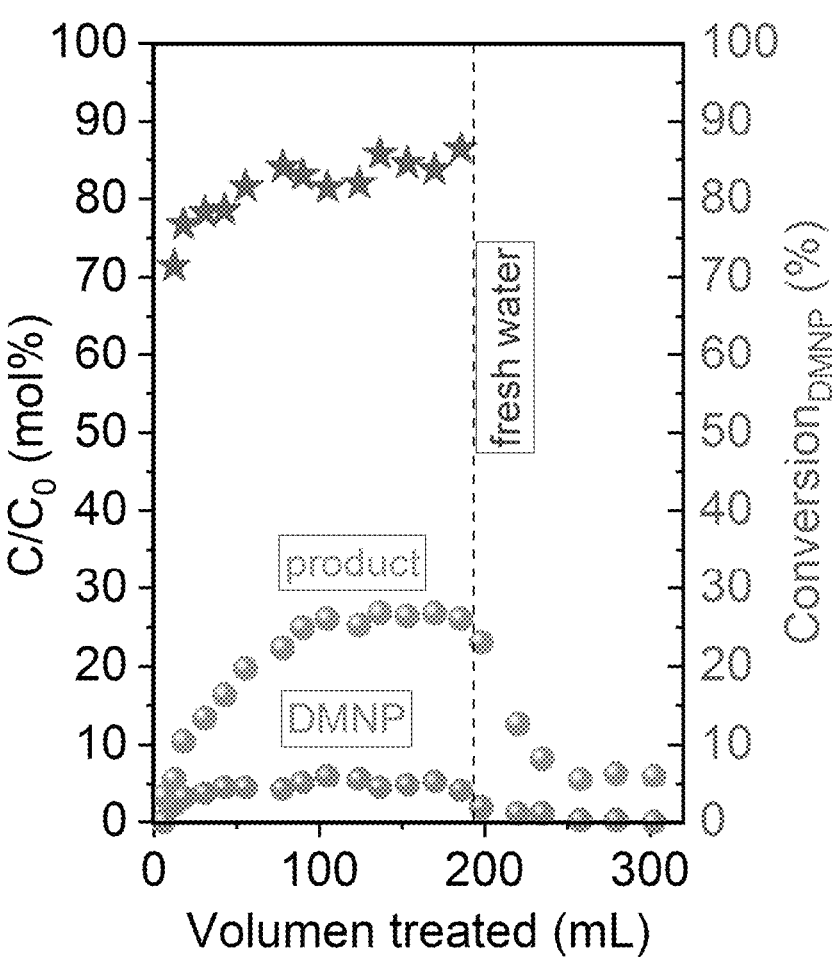
FIG. 4(g) is a chart showing 2$^{nd}$ run for DMNP hydrolysis performance of 40 wt % MOF/PAN electrospun nanofiber filter in continuous catalytic scrubber configuration.

MOF-polymer composite materials were also shaped into nanofibers via solution electrospinning of MOF-polymer composite inks prepared in DMF. FIG. 4(a)-4(g) provides a summary of characterization and catalytic data for (Zr)UiO-66(NH$_2$)/PAN electrospun nanofibers. FIG. 4(a) is a picture of MOF-polymer composite electrospun nanofibers utilized for the catalytic tests. FIGS. 4b, 4c, and 4d are SEM/EDS analysis showing the microstructure and composition of the MOF-polymer composite electrospun nanofibers (at 60 wt. % MOF). FIG. 4(e) is a chart showing catalytic activity for the different shaping process of (Zr)UiO-66(NH$_2$)/PAN materials at 40 wt % MOF loading (solid pellet, coated fabric and electrospun nanofibers). FIG. 4(f) is a chart showing catalytic activity (2$^{nd}$ run) for electrospun (Zr)UiO-66(NH$_2$)/PAN materials at different MOF loadings (20, 40 and 47 wt %). FIG. 4(g) is a chart showing 2$^{nd}$ run for DMNP hydrolysis performance of 40 wt % MOF/PAN electrospun nanofiber filter in continuous catalytic scrubber configuration. All catalytic tests were carried out using the same procedures as in FIG. 3 except in 4(g).

The characterization and catalytic performance data shown in FIG. 4a-4g for the different shaped materials reveals the ability of MOF-polymer composites to form nanofibers that preserve similar catalytic performance for CWA detoxification as other shapes (e.g., pellets and coatings). The results indicate that the detox activity is inherent to the MOF-polymer composite formulation, and is indifferent to the shaping process.

SEM images show the microstructure of the resulting fabrics composed of thin nanofibers (~100 nm in diameter), in which MOF nanocrystals are both dispersed as small MOF/polymer aggregates, and also embedded within the nanofiber, as evidenced by the presence of Zr and N in both morphologies in the EDS mapping (see FIG. 4b-d). Electrospun nanofibers containing pure MOF-polymer composites phase (no support) allowed for precise comparison of the effect of the MOF:PAN molar ratio (that is, the acid:base ratio) on the DMNP hydrolysis rates. The material containing 40 wt. % MOF (1:50 acid:base ratio) showed better performance than a material with a higher loading of MOF (47 wt. %, 1:38 acid:base ratio) and a material with a lower loading of MOF (20 wt. %. 1:133 acid:base ratio). This result suggests the formation of higher interfacial bifunctional active sites, which can be also supported by higher mesoporosity, as observed by N$_2$ sorption isotherms (see FIG. 1e).

Figure 7:
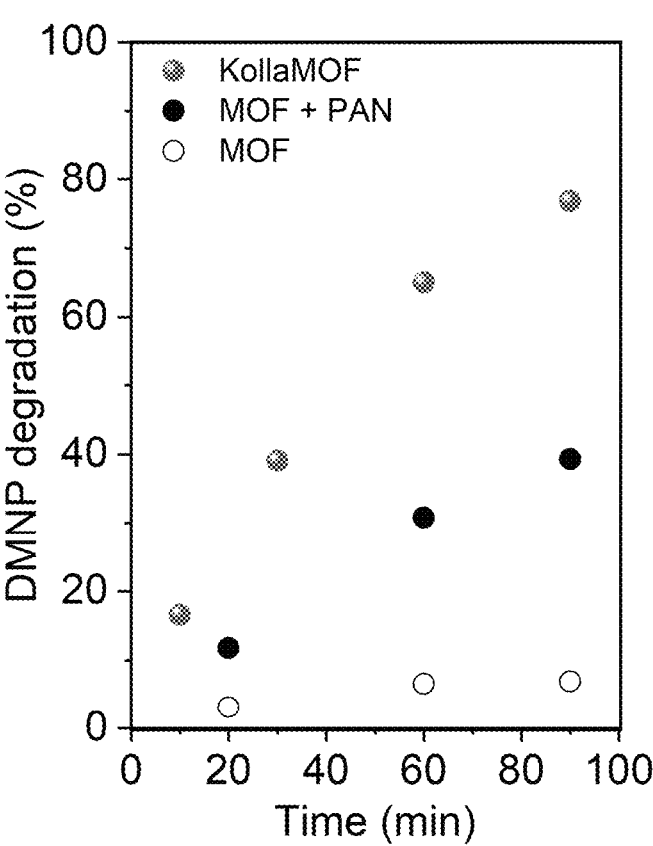
FIG. 7 is a chart comparing DMNP hydrolysis performance for MOF-PAN composite, MOF+PAN (solution mixture of bulk MOF and PAN), and bulk MOF.

Better catalytic performance has been measured for MOF-polymer composite material compared to conventional solution blending of bulk MOF with the polymer, while bulk MOF itself did not reveal catalytic activity at the same formulation in distilled water. FIG. 7, a chart comparing DMNP hydrolysis performance for MOF-PAN composite, MOF+PAN (solution mixture of bulk MOF and PAN), and bulk MOF, shows these results.

The results promote the use of a one-pot synthesis approach to improve MOF-polymer interface versus conventional methodologies. The proposed method has the benefits of eliminating synthesis steps, decreasing time for synthesis (instantaneous), and avoiding tedious separation procedures (polymer act as precipitating agent). Furthermore, the bifunctional nature of MOF-polymer composite fabrics enable the evaluation of the catalytic performance for CWA hydrolysis using in situ techniques available for solid characterization, such as FTIR-ATR or magic-angle spinning (MAS) NMR, which will be very helpful for future advancement of these materials.

A performance simulation for MOF-polymer composite materials as active nanofiber filter component installed in a catalytic scrubber configuration for CWA detoxification was performed. The technology can be incorporated in portable respiratory systems designed to provide breathable clean air during a CWA attack. Advantageously, the MOF-polymer composite material can be easily regenerated by simply washing in pure water.

For the design of the simulation, it was assumed that a human of 70 Kg breathing 15 L min$^{-1}$ of air, after 1 minute of exposure to a minimum lethal dose (1 µg L$^{-3}$ min$^{-1}$), would be inhaling a total dose of 15 µg of CWA. Bubbling this volume of contaminated air through a catalytic scrubber immersed into 200-mL of water, a CWA aqueous solution of 75 ng mL$^{-1}$ was formed, and subsequently processed across the adsorbing catalytic filter installed on the respiratory equipment. With this concentration as reference, we have evaluated the detoxifying performance of an exemplary MOF-polymer composite (i.e. 40 wt. % UiO-66(NH$_2$)/PAN) for the accumulative dose corresponding to 5 hours of continuous exposure (approximately 5 mg of DMNP) in 200 ml H$_2$O (50 µg/mL) flowing by gravity (~1 mL min$^{-1}$) across a filter consisting in 8-folds of electrospun fabric 47 mm in diameter (approximately 30 mg of MOF-polymer composite). The DMNP solution used in the simulation was added all at once instead of being dosed.

As shown by the 2$^{nd}$ run for this material (FIG. 4g), approximately 95% of the DMNP is retained in the MOF-polymer composite filter and subsequently hydrolyzed to non-toxic product with no apparent loss of activity. Conversion at the permeate revealed elevated DMNP hydrolysis to non-toxic product improving with time, which lead to full conversion of DMNP at the step of the regeneration with fresh water. This evidences the promising application of MOF-polymer composite filters for this application, as higher areas and thickness of the highly permeable fabric will lead to advanced (or even full) protection.

In addition, MOF-polymer composite filters could combine fabrics with higher adsorbing properties (i.e. porous polymers such as 6FDA-DAM) as first layers to buffer the CWA peak dose, followed by layers exhibiting higher catalytic formulations as well as optimal water permeability (i.e. nucleophilic polymers) into multilayer-multicomponent stacked filters. This configuration could also be directly applied to treat CWA stockpile as well as purifying drinkable water by gravity (non-powered).

In embodiments, performance of MOF-polymer composite fabrics is optimized by modification of the chemical functionality of both the MOF and the polymer. For example, an efficient and green post-synthesis modification approach involves covalently bonding amines to amino-functionalized MOFs through phosphine bridges. The resulting phosphine-tethered amino-containing compound has excellent stability against leaching in water and organic solvents. The post-synthesis modification of MOF-polymer composite materials allows for the heterogenization of additional basic sites at close distances to Zr Lewis acid sites.

Example 5. Evaluation of Composite Performance after Post-Synthesis Modification FIGS. 5(a) and 5(b) are charts showing DMNP hydrolysis activity for 40 wt. % (Zr)UiO-66(NH$_2$)/PAN electrospun fabric after two-step post-synthesis modification consisting in tethering N-aminopropyl morpholine to MOF pending amines via phosphine linkage. FIG. 5(a) shows results for a batch reaction configuration, and FIG. 5(b) shows results for a continuous catalytic scrubber configuration. As can be seen, sequential addition of tris(hydroxymethyl)phosphine followed by N-aminopropylmorpholine to 40 wt. % (Zr) UiO-66(NH$_2$)/PAN electrospun fabric in water lead to a significant boost of DMNP hydrolysis activity.

The modified nanofibers were thoroughly washed with distilled water prior to the activity testing in order to get rid of non-bonded morpholine species. Catalytic tests in continuous flow (catalytic scrubber) revealed a boost in activity in terms of higher DMNP conversion, but also higher permeation across the filter of the toxic compound DMNP compared to unmodified fabric, which may be attributed to the concomitant modification of the chemical environment (i.e. higher hydrophilicity). A second run of this material, in both reaction configurations, showed a notable drop-in activity, which may be related to a cleavage of the covalently-bonded morpholine during the DMNP hydrolysis.

This theory is based on the yellowish color of the permeated solution during the 1$^{st}$ run, which was clear indicator of the formation of nitrophenoxy radicals under basic media, originated by the leaching of the tethered amines from the fabric to the solution. This occurrence has never been observed for unmodified fabric, always operating under slightly acidic media caused by the presence of DMNP and hydrolyzed products in distillated water (pH-4.5-5.5), assuring the truly heterogeneous nature of unmodified (Zr)UiO-66(NH$_2$)/PAN bifunctional catalytic fabrics. Further optimization could lead to better stabilization of the bonded species during the reaction. The triggered release of amines could serve to boost catalytic activity in specific situations, or even utilized for sensing purposes based on the strong color of the radical species.

Inspired from enzymatic systems, bifunctional porous MOF-polymer composites enable the combination of MOF nanocrystals with polymeric shells also displaying free nucleophilic functional groups, which are typically found in the enzymatic residues comprising aminoacids, such as alkylamines, anilines, imidazoles and pyridines. Using MOF-polymer composites opens a wide variety of designs and formulations originated from blending one or multiple polymers, combined either in-synthesis (during solvothermal synthesis) or post-synthesis (blending MOF-polymer composite inks with polymers).

Polyvinyl pyridine (PVP) has been tested, but the list of possible polymers can be extended to other nucleophilic soluble polymers and copolymers that are water insoluble. It is important that the polymer is water-insoluble to prevent phase leaching occurring for water-soluble polyethyleneimine.

Figure 8A:
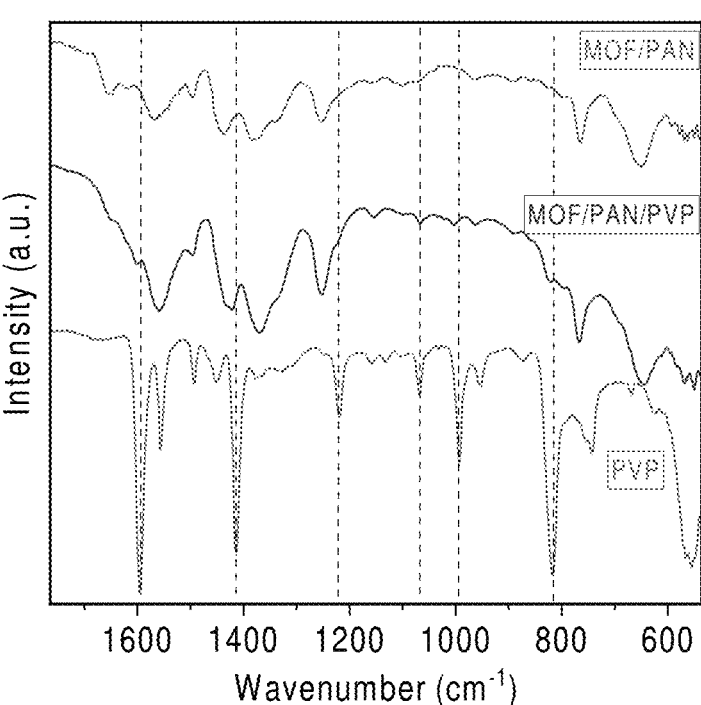
FIG. 8(a) is a chart showing FTIR analysis results for a MOF-polymer composite containing two polymers (PAN+PVP), a MOF-polymer composite containing only PAN, and an example containing only PVP polymer.
Figure 8B:
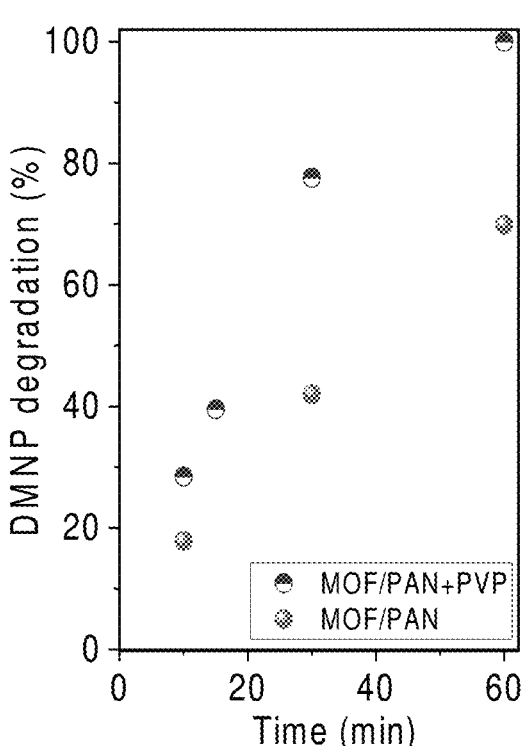
FIG. 8(b) is a chart showing DMNP hydrolysis performance results for a MOF-polymer composite containing two polymers (PAN+PVP) and a MOF-polymer composite containing only PAN.

In an exemplary embodiment, (Zr)UiO-66(NH$_2$) nanocrystals were produced in the presence of a 50:50 mixture of PAN and PVP via solvothermal synthesis. As shown by the FTIR analysis of the resulting KollaMOF solid pellet, the vibrational bands attributed to PVP are present on the MOF/PAN/PVP. FIG. 8(a) is a chart showing FTIR analysis results for a MOF-polymer composite containing two polymers (PAN+PVP), a MOF-polymer composite containing only PAN, and an example containing only PVP polymer. FIG. 8(b) is a chart showing DMNP hydrolysis performance results for a MOF-polymer composite containing two polymers (PAN+PVP) and a MOF-polymer composite containing only PAN. The enhancement of the resulting hydrolysis rates for the material containing PVP revealed the possibility of optimization of MOF-polymer composites by using nucleophilic polymers with higher basicity, such as pyridine.

REFERENCES (1) Son, F. A.; Wasson, M. C.; Islamoglu, T.; Chen, Z.; Gong, X.; Hanna, S. L.; Lyu, J.; Wang, X.; Idrees, K. B.; Mahle, J. J.; Peterson, G. W.; Farha, O. K. Uncovering the role of metal-organic framework topology on the capture and reactivity of chemical warfare agents. *Chem. Mater.* 2020, 32 (11), 4609-4617, DOI: 10.1021/acs.chemmater.0c00986.

(2) Mondloch, J. E.; Katz, M. J.; Isley Iii, W. C.; Ghosh, P.; Liao, P.; Bury, W.; Wagner, G. W.; Hall, M. G.; DeCoste, J. B.; Peterson, G. W.; Snurr, R. Q.; Cramer, C. J.; Hupp, J. T.; Farha, 0. K. Destruction of chemical warfare agents using metal-organic frameworks. *Nat. Mater.* 2015, 14 (5), 512-516, DOI: 10.1038/nmat4238.

(3) Bobbitt, N. S.; Mendonca, M. L.; Howarth, A. J.; Islamoglu, T.; Hupp, J. T.; Farha, 0. K.; Snurr, R. Q. Metal-organic frameworks for the removal of toxic industrial chemicals and chemical warfare agents. *Chem. Soc. Rev.* 2017, DOI: 10.1039/c7cs00108h.

(4) Islamoglu, T.; Ortuilo, M. A.; Proussaloglou, E.; Howarth, A. J.; Vermeulen, N. A.; Atilgan, A.; Asiri, A. M.; Cramer, C. J.; Farha, O. K. Presence versus proximity: The role of pendant amines in the catalytic hydrolysis of a nerve agent simulant. *Angew. Chem., Int. Ed.* 2018, 57 (7), 1949-1953, DOI: 10.1002/anie.201712645.

(5) Palomba, J. M.; Credille, C. V.; Kalaj, M.; DeCoste, J. B.; Peterson, G. W.; Tovar, T. M.; Cohen, S. M. High-throughput screening of solid-state catalysts for nerve agent degradation. *Chem. Commun.* 2018, 54 (45), 5768-5771, DOI: 10.1039/C8CC03255F.

(6) Kalaj, M.; Cohen, S. M. Spray-coating of catalytically active mof-polythiourea through postsynthetic polymerization. *Angew. Chem., Int. Ed.* 2020, 59 (33), 13984-13989, DOI: 10.1002/anie.202004205.

(7) Palomba, J. M.; Harvey, S. P.; Kalaj, M.; Pimentel, B. R.; DeCoste, J. B.; Peterson, G. W.; Cohen, S. M. High-throughput screening of mofs for breakdown of v-series nerve agents. *ACS Appl. Mater. Interfaces* 2020, 12 (13), 14672-14677, DOI: 10.1021/acsami.9b21693.

(8) Chen, Z.; Islamoglu, T.; Farha, O. K. Toward base heterogenization: A zirconium metal-organic framework/dendrimer or polymer mixture for rapid hydrolysis of a nerve-agent simulant. *ACS Applied Nano Materials* 2019, 2 (2), 1005-1008, DOI: 10.1021/acsanm.8b02292.

(9) Luz, I.; Soukri, M.; Lail, M. Confining metal-organic framework nanocrystals within mesoporous materials: A general approach via "solid-state" synthesis. *Chem. Mater.* 2017, 29 (22), 9628-9638, DOI: 10.1021/acs.chemmater.7b02042.

(10) Cirujano, F. G.; Luz, I.; Soukri, M.; Van Goethem, C.; Vankelecom, I. F. J.; Lail, M.; De Vos, D. E. Boosting the catalytic performance of metal-organic frameworks for steroid transformations by confinement within a mesoporous scaffold. *Angew. Chem., Int. Ed.* 2017, 56 (43), 13302-13306, DOI: 10.1002/anie.201706721.

(11) Knebel, A.; Bavykina, A.; Datta, S. J.; Sundermann, L.; Garzon-Tovar, L.; Lebedev, Y.; Durini, S.; Ahmad, R.; Kozlov, S. M.; Shterk, G.; Karunakaran, M.; Carja, I. D.; Simic, D.; Weilert, I.; Klüppel, M.; Giese, U.; Cavallo, L.; Rueping, M.; Eddaoudi, M.; Caro, J.; Gascon, J. Solution processable metal-organic frameworks for mixed matrix membranes using porous liquids. *Nat. Mater.* 2020, DOI: 10.1038/s41563-020-0764-y.

(12) Luz, I.; Toy, L.; Rabie, F.; Lail, M.; Soukri, M. Synthesis of soluble metal organic framework composites for mixed matrix membranes. *ACS Appl. Mater. Interfaces* 2019, 11 (17), 15638-15645, DOI: 10.1021/acsami.9b02622.

(13) Maserati, L.; Meckler, S. M.; Li, C.; Helms, B. A. Minute-mofs: Ultrafast synthesis of m2(dobpdc) metal-organic frameworks from divalent metal oxide colloidal nanocrystals. *Chem. Mater.* 2016, 28 (5), 1581-1588, DOI: 10.1021/acs.chemmater.6b00494.

(14) Luz, I.; Loiudice, A.; Sun, D. T.; Queen, W. L.; Buonsanti, R. Understanding the formation mechanism of metal nanocrystal@mof-74 hybrids. *Chem. Mater.* 2016, 28 (11), 3839-3849, DOI: 10.1021/acs.chemmater.6b00880.

(15) Katz, M. J.; Moon, S.-Y.; Mondloch, J. E.; Beyzavi, M. H.; Stephenson, C. J.; Hupp, J. T.; Farha, O. K. Exploiting parameter space in mofs: A 20-fold enhancement of phosphate-ester hydrolysis with uio-66-nh2. *Chem. Sci.* 2015, 6 (4), 2286-2291, DOI: 10.1039/C4SC03613A.

(16) Chen, L.; Bromberg, L.; Schreuder-Gibson, H.; Walker, J.; Alan Hatton, T.; Rutledge, G. C. Chemical protection fabrics via surface oximation of electrospun polyacrylonitrile fiber mats. *J. Mater. Chem.* 2009, 19 (16), 2432-2438, DOI: 10.1039/B818639A.

(17) Luz, I.; Rosler, C.; Epp, K.; Xamena, F.; Fischer, R. A. Pd@uio-66-type mofs prepared by chemical vapor infiltration as shape-selective hydrogenation catalysts. *Eur. J. Inorg. Chem.* 2015, (23), 3904-3912, DOI: 10.1002/ejic.201500299.

(18) Gomes Silva, C.; Luz, I.; Llabrés i Xamena, F. X.; Corma, A.; Garcia, H. Water stable zr-benzenedicarboxylate metal-organic frameworks as photocatalysts for hydrogen generation. *Chemistry—A European Journal* 2010, 16 (36), 11133-11138, DOI: 10.1002/chem.200903526.

(19) Kandiah, M.; Nilsen, M. H.; Usseglio, S.; Jakobsen, S.; Olsbye, U.; Tilset, M.; Larabi, C.; Quadrelli, E. A.; Bonino, F.; Lillerud, K. P. Synthesis and stability of tagged uio-66 zr-mofs. *Chem. Mater.* 2010, 22 (24), 6632-6640, DOI: 10.1021/cm102601v.

(20) Wong, K.-Y.; Gao, J. The reaction mechanism of paraoxon hydrolysis by phosphotriesterase from combined qm/mm simulations. *Biochemistry* 2007, 46 (46), 13352-13369, DOI: 10.1021/bi700460c.

(21) Chapter 4—the electrorheological materials. In *Studies in interface science*; Hao, T., Ed.; Elsevier: 2005; pp 114-151.

(22) Li, Y.; Liang, Y.; Hu, H.; Dong, H.; Zheng, M.; Xiao, Y.; Liu, Y. Kno3-mediated synthesis of high-surface-area polyacrylonitrile-based carbon material for exceptional supercapacitors. *Carbon* 2019, 152, 120-127, DOI: https://doi.org/10.1016/j.carbon.2019.06.001.

(23) Kalinovskyy, Y.; Wright, A. J.; Hiscock, J. R.; Watts, T. D.; Williams, R. L.; Cooper, N. J.; Main, M. J.; Holder, S. J.; Blight, B. A. Swell and destroy: A metal-organic framework-containing polymer sponge that immobilizes and catalytically degrades nerve agents. *ACS Appl. Mater. Interfaces* 2020, 12 (7), 8634-8641, DOI: 10.1021/acsami.9b18478.

(24) Guillerm, V.; Gross, S.; Serre, C.; Devic, T.; Bauer, M.; Férey, G. A zirconium methacrylate oxocluster as precursor for the low-temperature synthesis of porous zirconium (iv) dicarboxylates. *Chem. Commun.* 2010, 46 (5), 767-769, DOI: 10.1039/B914919H.

(25) Tranchemontagne, D. J.; Ni, Z.; O'Keeffe, M.; Yaghi, O. M. Reticular chemistry of metal-organic polyhedra. *Angew. Chem., Int. Ed.* 2008, 47 (28), 5136-5147, DOI: 10.1002/anie.200705008.

(26) Ma, K.; Idrees, K. B.; Son, F. A.; Maldonado, R.; Wasson, M. C.; Zhang, X.; Wang, X.; Shehayeb, E.; Merhi, A.; Kaafarani, B. R.; Islamoglu, T.; Xin, J. H.; Farha, O. K. Fiber composites of metal-organic frameworks. *Chem. Mater.* 2020, 32 (17), 7120-7140, DOI: 10.1021/acs.chemmater.0c02379.

(27) Dechnik, J.; Gascon, J.; Doonan, C. J.; Janiak, C.; Sumby, C. J. Mixed-matrix membranes. *Angew. Chem., Int. Ed.* 2017, 56 (32), 9292-9310, DOI: 10.1002/anie.201701109.

(28) Kitao, T.; Zhang, Y. Y.; Kitagawa, S.; Wang, B.; Uemura, T. Hybridization of mofs and polymers. *Chem. Soc. Rev.* 2017, 46 (11), 3108-3133, DOI: 10.1039/c7cs00041c.

(29) Zhang, Y.; Yuan, S.; Feng, X.; Li, H.; Zhou, J.; Wang, B. Preparation of nanofibrous metal-organic framework filters for efficient air pollution control. *J. Am. Chem. Soc.* 2016, 138 (18), 5785-5788, DOI: 10.1021/jacs.6b02553.

(30) Lukey, B.; Romano Jr., J.; Salem, H. *Chemical warfare agents*, Boca Raton: CRC Press: 2019.

(31) Luz, I.; Soukri, M.; Lail, M. Flying mofs: Polyamine-containing fluidized mof/sio2 hybrid materials for co2 capture from post-combustion flue gas. *Chem. Sci.* 2018, 9 (20), 4589-4599, DOI: 10.1039/c7sc05372j.

(32) Bromberg, L.; Creasy, W. R.; McGarvey, D. J.; Wilusz, E.; Hatton, T. A. Nucleophilic polymers and gels in hydrolytic degradation of chemical warfare agents. *ACS Appl. Mater. Interfaces* 2015, 7 (39), 22001-22011, DOI: 10.1021/acsami.5b06905.

That which is claimed:

1. A metal organic framework (MOF)-polymer composite for detoxifying a chemical warfare agent (CWA), the composite comprising:

MOF nanoparticles having catalytically active Lewis acid sites, and at least one polymer having catalytically active basic sites, wherein the composite comprises a nano-crystalline metal organic framework having an average diameter in the range of 5-100 nm;

wherein the composite comprises an amount of MOF ranging from about 15 wt % to about 50 wt % relative to the total weight of the composite;

wherein the composite has a surface area in the range of 10-1200 m²/g;

wherein the at least one polymer comprises a polymeric mesoporous material comprising mesopores and the nano-crystalline metal organic framework comprises micropores; and wherein the mesopores have an average diameter in the range of 2-50 nm and the micropores have an average diameter in the range of 0.5-4.0 nm.

2. The composite of claim 1, wherein the MOF comprises Group 4 elements (i.e. Ti, Zr, Hf) or rare earth elements (i.e. Ce) as metal oxide node.

3. The composite of claim 1, wherein the at least one polymer is water insoluble.

4. The composite of claim 1, wherein the at least one polymer comprises polybenzimidazoles, polyimides, polyvinyl butyral, polyacrylonitrile, or polyvinyl pyridine.

5. The composite of claim 1, wherein the chemical warfare agent comprises organophosphate.

6. The composite of claim 1, wherein the metal organic framework-polymer composite is provided in the form of a pellet, nanofiber, nanofiber membrane, a thin film, a coating on a substrate (such as a coated filter, fabric or metal), or a component incorporated into a substrate (such as being embedded in a nanofiber).

7. The composite of claim 1, further comprising an amine compound covalently bonded to amino-functionalized MOF particles, or an amine compound covalently bonded to MOF particles.

8. A method of detoxifying a chemical warfare agent (CWA), comprising exposing the MOF-polymer composite of claim 1 to the CWA thereby catalyzing a hydrolysis reaction in which the CWA is degraded into non-toxic products.

9. The method of claim 8, wherein the MOF-polymer composite is coated on or embedded in personal protective equipment.

10. The method of claim 9, wherein the coating comprises one or more different layers of MOF-polymer composite.

11. The method of claim 9, wherein the MOF-polymer composite is incorporated as a nanofiber filter component in a portable respiratory system, or as a nanofiber membrane component in a portable respiratory system.

12. The method of claim 8, wherein the MOF-polymer composite is used in a catalytic scrubber.

13. The method of claim 8, further comprising regenerating the catalytic activity of the MOF-polymer composite by washing away the non-toxic products of CWA hydrolysis using water.

* * * * *